US005968301A

United States Patent [19]

Murakami et al.

[11] Patent Number: 5,968,301

[45] Date of Patent: Oct. 19, 1999

[54] METHOD OF RECYCLING IMAGE SUPPORTING MATERIAL AND APPARATUS THEREOF

[75] Inventors: Kakuji Murakami; Sotohiro Tsujihara; Takeshi Iijima, all of Kanagawa; Masaaki Yamada, Tokyo, all of Japan

[73] Assignee: Ricoh Company, Ltd., Tokyo, Japan

[21] Appl. No.: 08/946,391

[22] Filed: Oct. 7, 1997

[30] Foreign Application Priority Data

| | | | |
|---|---|---|---|
| Oct. 7, 1996 | [JP] | Japan | 8-284709 |
| Sep. 22, 1997 | [JP] | Japan | 9-275352 |

[51] Int. Cl.[6] .......... B44C 1/165; B32B 31/00; B05C 11/02; B05D 3/00

[52] U.S. Cl. .......... 156/230; 156/234; 156/236; 156/240; 156/247; 118/106; 427/140; 427/264; 427/270

[58] Field of Search .......... 156/230, 234, 156/236, 238, 240, 241, 247, 277, 289; 427/240, 141, 264, 270, 271; 399/329; 118/106

[56] References Cited

U.S. PATENT DOCUMENTS

| | | | |
|---|---|---|---|
| 4,253,008 | 2/1981 | Dolan | 219/216 |
| 5,006,189 | 4/1991 | Tsukamoto et al. . | |
| 5,353,108 | 10/1994 | Tsukamoto . | |
| 5,474,617 | 12/1995 | Saito et al. . | |
| 5,534,063 | 7/1996 | Maruyama et al. . | |
| 5,540,815 | 7/1996 | Igarashi et al. | 162/5 |
| 5,545,381 | 8/1996 | Iida et al. . | |
| 5,547,793 | 8/1996 | Kuramoto et al. . | |
| 5,574,538 | 11/1996 | Takahashi et al. . | |
| 5,607,534 | 3/1997 | Kawanishi et al. . | |
| 5,612,766 | 3/1997 | Iida et al. . | |
| 5,638,842 | 6/1997 | Tokita et al. . | |
| 5,729,812 | 3/1998 | Moser | 399/329 |
| 5,778,294 | 7/1998 | Hiroaka et al. | 399/329 |

FOREIGN PATENT DOCUMENTS

| | | |
|---|---|---|
| 60-230899 | 11/1985 | Japan . |
| 1-297294 | 11/1989 | Japan . |
| 2-55195 | 2/1990 | Japan . |
| 3-68460 | 7/1991 | Japan . |
| 4-64472 | 2/1992 | Japan . |
| 4-64473 | 2/1992 | Japan . |
| 4-67043 | 3/1992 | Japan . |
| 4-89271 | 3/1992 | Japan . |
| 4-89283 | 3/1992 | Japan . |
| 4-94958 | 3/1992 | Japan . |
| 4-300395 | 10/1992 | Japan . |
| 4-333088 | 11/1992 | Japan . |
| 5-173454 | 7/1993 | Japan . |
| 5-216374 | 8/1993 | Japan . |
| 6-222604 | 8/1994 | Japan . |
| 7-98513 | 4/1995 | Japan . |
| 7-121073 | 5/1995 | Japan . |
| 7-134524 | 5/1995 | Japan . |
| 7-199756 | 8/1995 | Japan . |
| 7-199757 | 8/1995 | Japan . |
| 7-311523 | 11/1995 | Japan . |

*Primary Examiner*—David A. Simmons
*Assistant Examiner*—J. A. Lorengo
*Attorney, Agent, or Firm*—Oblon, Spivak, McClelland, Maier & Neustadt, P.C.

[57] ABSTRACT

A method of recycling an image supporting material from an image supporting material comprising a non-absorbent substrate and an absorbent swelling layer that swells with absorption of liquids, which is overlaid on the non-absorbent substrate, includes the steps of: applying to an image-bearing side of the image supporting material a liquid in an amount which exceeds a maximum amount of the liquid that can be absorbed by the swelling layer; leveling the liquid applied to the image-bearing side of the image supporting material to form a liquid film layer on the image supporting material; heating the swelling layer or the liquid film layer; bringing a peeling member into contact with the image forming material with the application of heat and pressure thereto when at least part of the liquid reaches an interface between the swelling layer and the image forming material deposited on the swelling layer; and separating said peeling member from image supporting material, to remove the image forming material from the image supporting material, and a recycling apparatus for this method is proposed.

12 Claims, 4 Drawing Sheets

METHOD OF RECYCLING IMAGE SUPPORTING MATERIAL AND APPARATUS THEREOF

BACKGROUND OF THE INVENTION

1. Field of the Invention

The present invention relates to a method of recycling an image supporting material on which images can be formed from an image supporting material which comprises (a) a non-absorbent substrate that absorbs no liquids and (b) an absorbent swelling layer that can absorb liquids and swells when absorbing liquids, which is overlaid on the non-absorbent substrate and on which images are formed, by eliminating from the image supporting material an image-forming material which constitutes the images which are formed by image formation apparatus such as copying machines, facsimile apparatus or printers. The present invention also relates to an apparatus for performing the above-mentioned method.

2. Discussion of Background

With the recent spread of printers and copying machines which employ various kinds of image formation processes such as electrophotography, thermal image transfer method, ink-jet printing method using a hot-melt ink, and other printing methods, an extremely large quantity of paper has been consumed. Papers used as the image supporting materials are generally made of wood pulp. The consumption of a large quantity of paper has caused the problems of environmental disruption of the earth due to deforestation. Furthermore, a large quantity of image supporting materials which bear images thereon formed by the above-mentioned image formation methods is discarded, so that the refuse disposal has become a serious problem.

A transparent sheet used as an image supporting material for an overhead projector (OHP) (hereinafter referred to as the OHP sheet) comprises as a base material a plastic film which is generally made of a polyester film or an acetate film. Raw materials for such plastics films are generally synthesized from fossil materials such as petroleum or produced from wood in the same manner as in the manufacturing of paper. Therefore, also with respect to the OHP sheets, a large quantity consumption thereof is not desirable in view of the protection of petroleum resources and global environmental conservation. When the OHP sheets are shredded by a shredder, the wearing of blades used in the shredder is considerable. When image supporting materials such as papers, and the OHP sheets are mixed and shredded, the recycling of the image supporting materials becomes almost impossible. Therefore conventionally the OHP sheets are often discarded without being shredded, which may cause a problem in the protection of secret image information recorded on the OHP sheets.

Conventionally, in order to solve the above problems, used papers or films are collected and beaten or melted again to recycle such image supporting materials. However, such a recycling method has the shortcoming that the efficiency of energy consumption thereof is so low that it occurs that recycled materials are more expensive, but poorer in quality than brand-new materials produced using new raw materials.

In order to solve this problem, Japanese Laid-Open Patent Application 4-300395 discloses a method of removing toner images from a toner-image bearing support material, that is, a toner-image bearing copy paper, by spraying or applying a solvent which is used in a copying machine for dissolving toner therein, and then removing the toner images from the toner-image bearing support material, using a cleaning blade or the like.

Many other methods of dissolving or swelling an image forming material to remove the image forming material from an image supporting material, which is similar to the above-mentioned methods, have already been proposed. In order to dissolve or swell the image forming material, an organic solvent such as toluene, xylene or tetrahydrofuran is usually employed. However, in view of safety, it is not desirable to use such organic solvents in a place where a special ventilator or solvent recovery apparatus is not provided.

Japanese Laid-Open Patent Application 1-29729 discloses a method of peeling images away from an image supporting material which comprises a non-absorbent material which absorb substantially no liquids, such as plastics, metal, a paper into which liquids hardly penetrate, or ceramics, by superimposing a thermofusible releasing member on the image supporting material with the application of heat thereto.

Japanese Laid-Open Patent Application 2-55195 discloses an image supporting material comprising a PET film which is subjected to a surface releasing treatment by coating the surface with a silicone seal agent.

Japanese Laid-Open Patent Application 4-64472 discloses an apparatus for peeling images away from the above-mentioned image supporting material subjected to the surface releasing treatment.

The above-mentioned method and apparatus are advantageous over other conventional methods and apparatus in that no liquids are employed for removing image forming materials from the image supporting material.

The image supporting material employed in the above-mentioned method, however, significantly differs from paper which is in general use as an image supporting support material, for example, in terms of glossiness, surface properties and thickness, and gives a feeling of physical disorder to the users when actually used. Furthermore, this image supporting material includes the laminated releasing film which is expensive, and therefore the cost thereof is high. Furthermore, the image fixing performance of this image supporting material is not good, so that there is the problem that images are peeled off the image supporting material when touched with fingers or clothes, resulting in staining the fingers or clothes.

In order to solve the problems of the image fixing performance and the safety of the above-mentioned image supporting material, Japanese Laid-Open Patent Applications 6-222604 and 7-311523 disclose a method using an image supporting material comprising a non-absorbent substrate which absorbs no liquids and a swelling layer overlaid thereon, which swells with the absorption of liquids. Even with respect to images formed on a recycled image supporting material obtained from this image supporting material, the image fixing performance thereof can be appropriately maintained. When an image forming material which constitutes the images formed on the image supporting material is removed therefrom, a liquid which can swell the above-mentioned swelling layer is applied to the swelling layer so as to cause the swelling layer to swell, reducing the adhesion between the images and the image supporting material, whereby the removal of the images from the image supporting material is significantly facilitated. Furthermore, a liquid comprising water as the main component can be used as the above-mentioned liquid which can swell the swelling layer. Therefore, this method is also excellent in terms of safety. The image supporting material comprising (a) the non-absorbent substrate which absorbs no liquids, and (b) the swelling layer which is overlaid thereon and swells by the absorption of the liquid, hardly deteriorates due to the use of the non-absorbent substrate and therefore can be used repeatedly. In addition, this image supporting material has an advantage that the image forming material can be removed by use of a relatively small amount of the above-mentioned liquid.

From the image supporting material disclosed in Japanese Laid-Open Patent Applications 6-222604 and 7-311523, the image forming material which constitutes images formed thereon can be removed, for instance, (a) by immersing the image-bearing image supporting material in a liquid which swells the swelling layer, and vibrated in the liquid, (b) by applying ultrasonic waves to the image-bearing image supporting material, or (c) by rubbing the images off the image supporting material with a soft material such as sponge or felt. The image forming material can be easily removed from the image supporting material by any of the above-mentioned methods. However, the liquid in which the image supporting material is immersed is contaminated with the removed image forming material, so that some removing means for removing the image forming material from the liquid is required. As such removing means, a filter may be employed. However the filter is easily clogged with a relatively small amount of the image forming material. Therefore it is in practice difficult to eliminate the image forming material from the liquid by using the above-mentioned removing means.

Furthermore, there are many cases where the image forming material contains a dye which is soluble in the liquid. In such cases, if the dye is dissolved in the liquid, it is extremely difficult to make the liquid clear by removing the dissolved dye therefrom, using the filter only. It is time consuming to remove the image forming material from the liquid by a conventional apparatus and accordingly it is extremely difficult to remove the image forming material from the liquid at high speed.

As mentioned above, in the method disclosed in Japanese Laid-Open Patent Application 7-311523, the image supporting material which comprises a non-absorbent substrate which absorbs no liquids and a swelling layer which absorbs liquids and swells is employed. It is considered that in order to remove images from the supporting material, if the image forming material which constitutes the images is heated to the softening point of the image forming material, and is then transferred to a peeling member, there will be no problems as in the case where the image forming material is removed from the liquid. However, varieties of image supporting materials are used for commercially available varieties of image formation apparatus. Accordingly, varieties of image forming materials are used, which exhibit largely different physical properties with different melted and adhesion states, so that the above-mentioned method is not always applicable to all the image forming materials for the removal thereof at high speed. Furthermore, it is extremely difficult to remove the image forming material from a large solid image area formed on the image supporting material.

In Japanese Laid-Open Patent Application 8-44260, the applicants of the present invention proposed a recycling method and a recycling apparatus, in which a liquid is applied to an image supporting material comprising (a) a non-absorbent substrate that absorbs no liquids and (b) an absorbent swelling layer that can absorb liquids and swells with absorption of liquids, which is overlaid on the non-absorbent substrate and on which images are formed, and at least part of the swelling layer is covered with a seal member through which water does not permeate, thereby substantially preventing the evaporation of water from the swelling layer, and the swelling layer is subjected to heat treatment, whereby an image forming material which constitutes the images is peeled away from the image supporting material.

However, preferable conditions for employing the above-mentioned recycling method and recycling apparatus are limited in that it is preferable that the amount of the liquid applied to the image supporting material be controlled so as not to exceed a predetermined amount in order to prevent the reduction of the rigidity of the image supporting material.

SUMMARY OF THE INVENTION

It is therefore a first object of the present invention to provide a method of recycling an image supporting material on which images can be formed from an image supporting material which bears images thereon by removing an image forming material which constitutes the images formed on the image supporting material with high security and high efficiency, regardless of the kind of images formed on the image supporting material.

A second object of the present invention is to provide an apparatus for performing the above-mentioned method.

The first object of the present invention can be achieved by a method of recycling an image supporting material on which images can be formed from an image supporting material comprising (a) a non-absorbent substrate that cannot absorb liquids and (b) an absorbent swelling layer that swells with absorption of liquids, which is overlaid on the non-absorbent substrate and on which images are formed, by eliminating an image forming material which constitutes the images from the image supporting material, comprising the steps of:

- applying to an image-bearing side of the image supporting material a liquid in an amount which exceeds a maximum amount of the liquid that can be absorbed by the absorbent swelling layer;
- leveling the liquid applied to the image-bearing side of the image supporting material to form a liquid film layer on the image-bearing side in its entirety of the image supporting material;
- heating the absorbent swelling layer or the liquid film layer;
- bringing a peeling member into contact with the image forming material with the application of heat and pressure thereto when at least part of the liquid which constitutes the liquid film layer reaches an interface between the absorbent swelling layer and the image forming material deposited on the absorbent swelling layer, thereby causing the image forming material to adhere to the peeling member; and
- separating the peeling member to which the image forming material adheres from the image supporting material, thereby removing the image forming material from the image supporting material.

The second object of the present invention can be achieved by an apparatus for recycling an image supporting material on which images can be formed from an image supporting material comprising (a) a non-absorbent substrate that cannot absorb liquids and (b) an absorbent swelling layer that swells with absorption of liquids, which is overlaid on the non-absorbent substrate and on which images are formed, by eliminating an image-forming material which constitutes the images from the image bearing support material, comprising:

- a liquid application section where a liquid is applied to an image-bearing side of the image supporting material in such an amount that exceeds a maximum amount of the liquid that can be absorbed by the absorbent swelling layer;

a pair of holding and transport members, which hold therebetween the image supporting material to which the liquid has been applied, and transport the image supporting material along a holding and transport path, at least one of which holding and transport members comes into contact with the image-bearing side and comprises a peeling member which can be brought into contact with the image-forming material deposited on the absorbent swelling layer and comprises a material that can adhere to the image-forming material;

a heating member which heats (a) the absorbent swelling layer or the liquid film layer deposited on the image bearing support material which is held between the pair of holding and heating members, and (b) the image-forming material deposited on the image bearing support material;

a pressure application member which applies pressure to the holding and transport members in such a manner that the holding and transport member comprising the peeling member is caused to adhere to the image-forming material deposited on the image supporting material, at a position on the holding and transport path, where at least part of the liquid which constitutes the liquid film layer reaches an interface between the absorbent swelling layer and the image-forming material deposited on the absorbent swelling layer; and a separating section where the holding and transport member comprising the peeling member is separated from the image supporting material.

In the above-mentioned apparatus, the holding and transport member comprising the peeling member may be composed of a material through which a vapor of the liquid which constitutes the liquid film layer cannot permeate.

Furthermore, in the above-mentioned apparatus, the pair of holding and transport members may comprise (a) a rotatable heating drum in which the heating member is built, and (b) a belt-shaped peeling member which is movably supported by at least two rollers, whereby the image supporting material is transported while held between part of an outer peripheral surface of the heating drum and the belt-shaped peeling member, one of the two rollers being situated at a holding transport initiation position for the image supporting material, and the other roller being situated at a holding transport termination position for the image supporting material, and the pressure application member comprises a pressure application roller which brings the belt-shaped peeling member into pressure contact with the heating drum on the holding and transport path which extends from the holding transport initiation position up to the holding transport termination position.

Furthermore, in the above-mentioned apparatus, the liquid application section may comprise:

a liquid container for containing the liquid, a rotatable roller-shaped liquid application member which is partly immersed in the liquid in the liquid container and capable of holding the liquid on a surface thereof and applying the liquid to the image supporting material, and a roller-shaped holding member for holding and urging the image supporting material toward the rotatable roller-shaped liquid application member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2(*d*) is a schematic cross-sectional view of an image supporting material in explanation of a process of the absorption of the image removal promoting liquid in a comparative recycling method.

DESCRIPTION OF THE PREFERRED EMBODIMENTS

Figure 1:
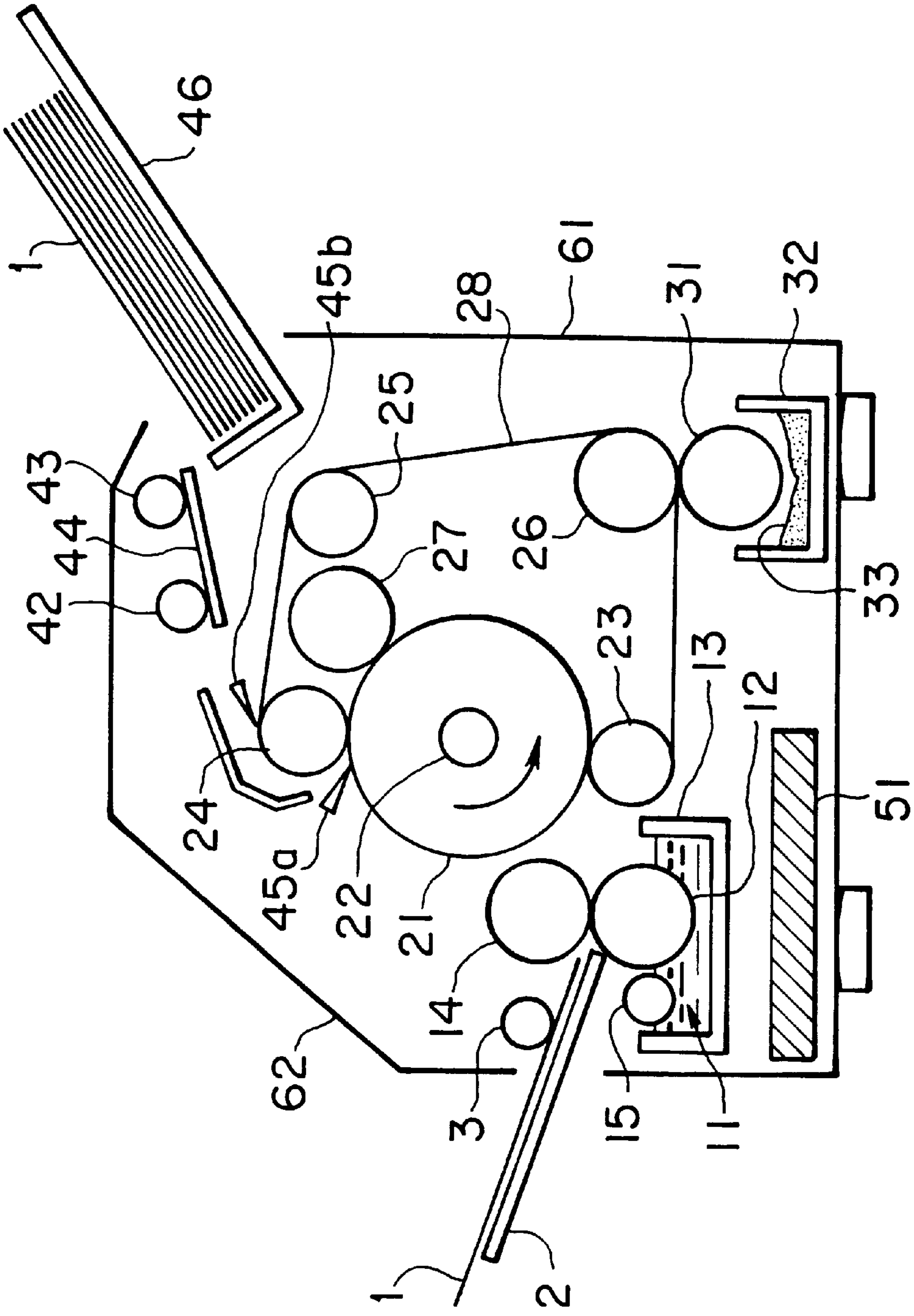
FIG. 1 is a schematic cross-sectional view of an embodiment of an apparatus for recycling image supporting materials according to the present invention.
Figure 2A:
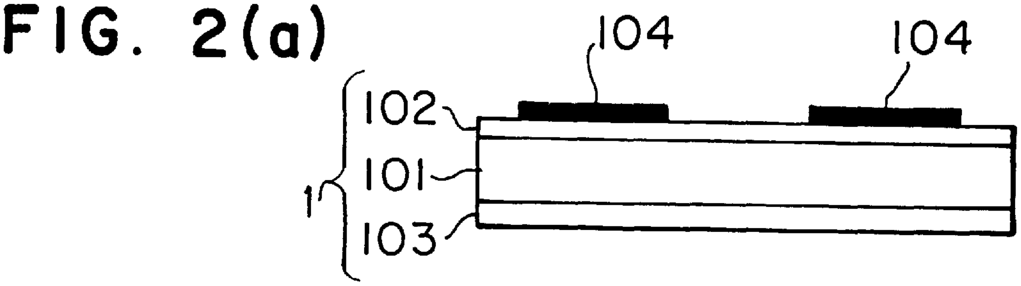
FIGS. 2(*a*) to 2(*c*) are schematic cross-sectional views of an image supporting material in explanation of a process of the absorption of an image removal promoting liquid in the apparatus of the present invention shown in FIG. 1.
Figure 2B:
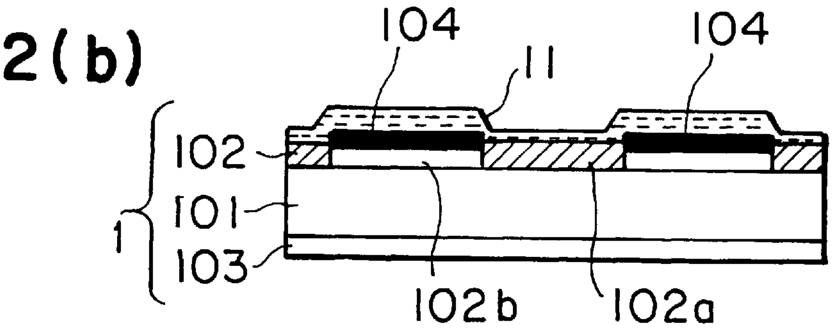
Figure 2C:
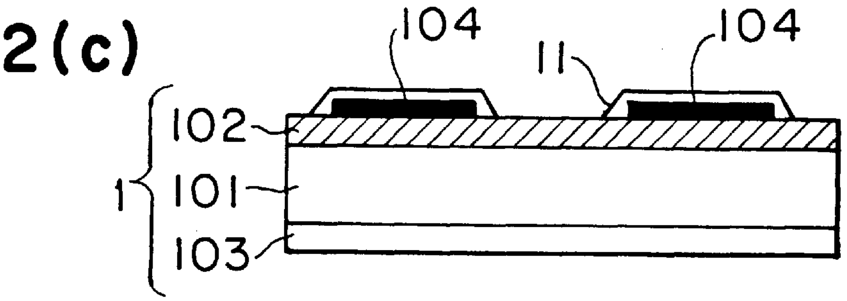
Figure 2D:
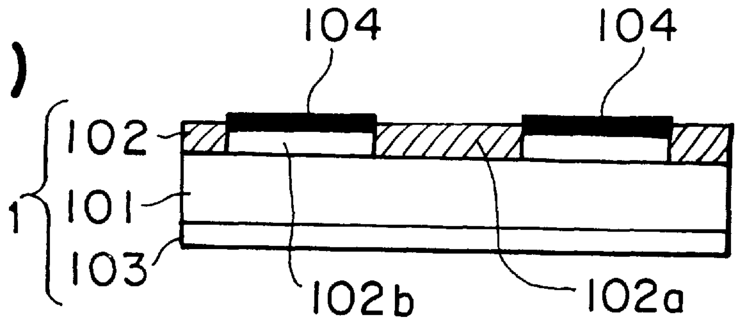

As mentioned above, in the method of recycling an image supporting material on which images can be formed from an image bearing image supporting material according to the present invention, the image bearing image supporting material comprises (a) a non-absorbent substrate that cannot absorb liquids and (b) an absorbent swelling layer that swells with absorption of liquids, which is overlaid on the non-absorbent substrate, and an image forming material which constitutes the images is removed from the image bearing image supporting material by the steps of:

applying to an image-bearing side of the image supporting material a liquid in an amount which exceeds a maximum amount of the liquid that can be absorbed by the absorbent swelling layer;

leveling the liquid applied to the image-bearing side of the image supporting material to form a liquid film layer on the image-bearing side of the image supporting material;

heating the absorbent swelling layer or the liquid film layer;

bringing a peeling member into contact with the image forming material with the application of heat and pressure thereto when at least part of the liquid which constitutes the liquid film layer reaches an interface between the absorbent swelling layer and the image forming material deposited on the absorbent swelling layer, thereby causing the image forming material to adhere to the peeling member; and separating the peeling member to which the image forming material adheres from the image supporting material, thereby removing the image forming material from the image supporting material.

In this method, a liquid is applied to an image-bearing side of the image supporting material in an amount which exceeds a maximum amount of the liquid that can be absorbed by the absorbent swelling layer.

The liquid applied to the image-bearing side of the image supporting material is then leveled to form a uniform liquid film layer on the image-bearing side in its entirety of the image supporting material, or spread on the image-bearing side in its entirety of the image supporting material, whereby the liquid which constitutes the liquid film layer is caused to sufficiently permeate through the swelling layer.

The swelling layer or the liquid film layer is then heated, whereby at least part of the liquid which constitutes the liquid film layer is caused to reach an interface between the swelling layer and the image forming material deposited on the swelling layer, and the swelling layer is then caused to swell with the absorption of the liquid. The result is that the adhesion between the image forming material and the swelling layer is significantly reduced.

After at least part of the liquid which constitutes the liquid film layer reaches the interface between the swelling layer and the image forming material deposited on the swelling layer, a peeling member is brought into contact with the image forming material with the application of heat and pressure thereto, so that the image forming material is softened and adheres to the peeling member.

The peeling member to which the image forming material adheres is then separated from the image supporting material, whereby the image forming material is removed from the surface of the image supporting material.

The apparatus for recycling the above-mentioned image supporting material according to the present invention, comprises:

a liquid application section where a liquid is applied to an image-bearing side of the image supporting material in such an amount that exceeds a maximum amount of the liquid that can be absorbed by the absorbent swelling layer;

a pair of holding and transport members, which hold therebetween the image supporting material to which the liquid has been applied, and transport the image supporting material along a holding and transport path, at least one of which holding and transport members comes into contact with the image-bearing side and comprises a peeling member which can be brought into contact with the image-forming material deposited on the absorbent swelling layer and comprises a material that can adhere to the image-forming material;

a heating member which heats (a) the absorbent swelling layer or the liquid film layer deposited on the image bearing support material which is held between the pair of holding and heating members, and (b) the image-forming material deposited on the image bearing support material;

a pressure application member which applies pressure to the holding and transport members in such a manner that the holding and transport member comprising the peeling member is caused to adhere to the image-forming material deposited on the image supporting material, at a position on the holding and transport path, where at least part of the liquid which constitutes the liquid film layer reaches an interface between the absorbent swelling layer and the image-forming material deposited on the absorbent swelling layer; and a separating section where the holding and transport member comprising the peeling member is separated from the image supporting material.

As mentioned above, in the liquid application section of this apparatus, the liquid is applied to an image-bearing side of the image supporting material in such an amount that exceeds a maximum amount of the liquid that can be absorbed by the absorbent swelling layer. The image supporting material to which the liquid has been applied is held between the pair of holding and transport members and transported along the holding and transport path, whereby the liquid applied to the image-bearing side of the image supporting material is leveled to form a uniform liquid film layer on the image-bearing side of the image supporting material, so that the liquid which constitutes the liquid film layer is caused to uniformly permeate through the swelling layer.

The swelling layer or the liquid film layer deposited on the image bearing support material, which is held between the pair of holding and heating members, is then heated by the heating member, whereby at least part of the liquid which constitutes the liquid film layer is caused to reach the interface between the swelling layer. Thus, the adhesion between the image forming material and the swelling layer is educed. The image forming material deposited on the swelling layer is heated by the heating member so as to be softened.

Pressure is then applied to the holding and transport members between which the image supporting member is held by the pressure application member in such a manner that the holding and transport members mutually apply pressure to the image supporting member, at a position on the holding and transport path, where at least part of the liquid which constitutes the liquid film layer reaches an interface between the absorbent swelling layer and the image-forming material deposited on the absorbent swelling layer, whereby the softened image forming material is caused to adhere to the peeling member. The peeling member to which the image forming material adheres is then separated from the image supporting material in the separating section. Thus, the image forming material deposited on the image supporting material is removed from the image supporting material.

According to the above-mentioned method and apparatus of the present invention, even in the case where the liquid is difficult to permeate into the swelling layer, due to the kind of images formed on the image supporting material, the liquid enters the interface between the swelling layer and the image forming material deposited thereon, and the swelling layer is caused to swell, so that the adhesion between the swelling layer and the image forming material is reduced. Thus, the image forming material that constitutes the images can be securely and efficiently removed from the image supporting material.

In the above-mentioned apparatus, the holding and transport member comprising the peeling member may be composed of a material through which a vapor of the liquid which constitutes the liquid film layer cannot permeate. In this case, the liquid, the image forming material and the swelling layer are held between (a) the non-absorbent substrate that cannot absorb liquids and (b) the holding and transport member comprising the peeling member which is composed of a material through which a vapor of the liquid which constitutes the liquid film layer cannot permeate, so that the swelling layer or the liquid film layer is heated under such conditions that the liquid is difficult to leak outside. The result is that the liquid readily and speedily permeates through the swelling layer as well as the image forming material. Accordingly the liquid readily and speedily reaches the interface between the swelling layer and the image forming material. It is assumed that the ready and speedy permeation of the liquid through the swelling layer and the image forming material is achieved by the evaporation of the liquid by the application of heat thereto to change the liquid into a near molecule state, which facilitates the permeation of the liquid through voids present within the swelling layer and the image forming material.

Furthermore, in the above-mentioned apparatus, the pair of holding and transport members may comprise (a) a rotatable heating drum in which the heating member is built, and (b) a belt-shaped peeling member which is movably supported by at least two rollers, whereby the image supporting material is transported while held between part of an outer peripheral surface of the heating drum and the belt-shaped peeling member, one of the two rollers being situated at a holding transport initiation position for the image supporting material, and the other roller being situated at a holding transport termination position for the image supporting material, and the pressure application member comprises a pressure application roller which brings the belt-shaped peeling member into pressure contact with the heating drum on the holding and transport path which extends from the holding transport initiation position up to the holding transport termination position.

In the above, the liquid applied to the image-bearing side of the image supporting material is leveled to form a uniform liquid film layer while the image supporting material is transported while held between part of an outer peripheral surface of the rotatable heating drum and the belt-shaped peeling member, whereby the liquid which constitutes the liquid film layer is caused to uniformly permeate the swelling layer.

The swelling layer of the image supporting material held between the above-mentioned heating drum and the peeling member, or the liquid film layer formed on the image supporting material, is heated by the heating drum in which the heating member is built, whereby the liquid which constitutes the liquid film layer is caused to reach the interface between the swelling layer and the image forming material deposited on the swelling layer. Thus, the swelling layer is caused to swell by the absorption of the liquid, whereby the adhesion between the swelling layer and the image forming material is reduced. The image forming material deposited on the swelling layer is heated by the above-mentioned heating drum so as to be softened.

The holding and transport member comprising the peeling member which holds the image supporting member is then urged toward the heating drum by the pressure application member, at a position on the holding and transport path, where at least part of the liquid which constitutes the liquid film layer reaches an interface between the absorbent swelling layer and the image-forming material deposited on the absorbent swelling layer, whereby the softened image forming material is caused to adhere to the peeling member. The peeling member to which the image forming material adheres is then separated from the image supporting material in the separating section. Thus, the image forming material deposited on the image supporting material is removed from the image supporting material.

Furthermore, in the above-mentioned apparatus, the liquid application section may comprise:

- a liquid container for containing the liquid,
- a rotatable roller-shaped liquid application member which is partly immersed into the liquid in the liquid container and capable of holding the liquid on a surface thereof and applying the liquid to the image supporting material, and
- a roller-shaped holding member for holding and urging the image supporting material toward the rotatable roller-shaped liquid application member.

In this apparatus, the rotatable roller-shaped liquid application member, which is partly immersed into the liquid in the liquid container, carries on the surface thereof the liquid in the liquid container. The image supporting material is held and urged toward the liquid-carrying rotatable roller-shaped liquid application member by the roller-shaped holding member. While the roller-shaped liquid application member is rotated, a substantially constant amount of the liquid carried on the application member is applied to the image supporting material, requiring a shorter period of time for the contact of the liquid on the application member with the image supporting member in comparison with the case where the image supporting material is immersed into the liquid, so that the liquid is difficult to be contaminated with the image forming material.

Further in the above apparatus, when the liquid is applied to the image-bearing side of the image supporting material in such an amount that exceeds a maximum amount or a saturation amount of the liquid that can be absorbed by the absorbent swelling layer in its entirety, the liquid is caused to permeate through the swelling layer in its entirety so that the liquid can be caused to reach the interface between the image forming material and the swelling layer.

Furthermore, in the above apparatus, when an image supporting material composed of a transparent substrate and a transparent swelling layer formed thereon is recycled, the image supporting material is placed on a manual feeding stack tray. In this case, when the stacking surface of the stack tray is colored with such a contrast that makes it possible to recognize the color of the image forming material deposited on the transparent image supporting material, the image-bearing surface side of the image supporting material to be placed on the stack tray can be easily recognized and accordingly the image supporting material can be fed in the right direction to the above-mentioned liquid application section. Thus, the misfeeding and jamming of the image supporting material within the apparatus can be prevented. Accordingly the smearing of the inside of the apparatus which may be caused by the above-mentioned jamming can be prevented.

In the above apparatus, there may be provided a cleaning member in the separating section, for removing residual materials which remain on the surface of the image supporting material after the image forming material is removed therefrom, such as excessive liquid, dust and the like, by lightly rubbing or touching the surface of the image supporting material. Thus, the image supporting material can be efficiently and effectively recycled.

Furthermore, there may be provided a liquid absorbing member or material which includes a gelatinizing agent for absorbing the above-mentioned liquid right under the liquid application section, by which the liquid which spills from the liquid application section can be caught, whereby troubles which may be caused in the apparatus by the spilt liquid can be prevented. The gelatinizing agent containing liquid absorbing member or material advantageously does not take much space in the apparatus.

The above-mentioned liquid facilitates and accelerates the removal of the image forming material from the image supporting material as explained above, so that this liquid is hereinafter referred to as the image removal promoting liquid.

Many image formation methods have been proposed to form images on the image supporting material to be recycled by the present invention, such as an electro-photographic method using dry toner or liquid toner, a thermal image transfer method using a thermofusible ink sheet, a thermal diffusion image transfer method using a thermal diffusion dye, an ink-jet printing method, a thermosensitive recording method using materials which are colored with the application of heat thereto, a silver salt photography, and printing methods such as offset printing, intaglio printing and relief printing.

The present invention is particularly suitable for removing images from the image supporting material, which are formed by the image formation methods in which a thermoplastic or thermofusible material is used as the image forming material, and the image forming material is formed in the shape of a thin film near the surface of the image supporting material, such as the conventional electrophotographic method, the thermal image transfer method, the ink-jet printing method using a hot-melt ink, or the above-mentioned printing methods.

The term "thin film" formed by the image forming material does not necessarily mean an integral film by which the entire images are formed, but a thin film which does not deeply penetrate the image supporting material, or of which image forming material is not adsorbed by the image supporting material at such a molecular level as in the images printed by a dye-containing water-based ink. Therefore, images formed by an electrophotographic method using dry toner, which are not solid images, but are scattered images formed by toner particles, with each toner particle being present individually without penetrating the image supporting material, may be considered as the images which are formed in the shape of the thin film in the above-mentioned sense. Such toner images can be removed by the present invention.

As mentioned above, the image supporting material for use in the present invention comprises (a) the non-absorbent substrate that absorbs no liquids and (b) the absorbent swelling layer that can absorb liquids and swells with absorption of liquids, which is overlaid on the non-absorbent substrate. This image supporting material is disclosed in Japanese Laid-Open Patent Applications 6-222604 and 7-311523.

Examples of materials for the non-absorbent substrate are films made of polyester such as polyethylene terephthalate or polyethylene naphthylate; plastics made from cellulose such as cellulose triacetate, cellulose diacetate, or nitrocellulose, plastics; polycarbonate made from bisphenol A or bisphenol; polyimide; polyamides such as 6,6-nylon, 6-nylon and alamide; and plastics such as polyether sulfone, polyether ether ketone, polyphenylene sulfite, and polypropylene.

Image supporting materials for which transparency is required, for instance, OHP sheets, can be prepared from the above-mentioned material with relatively high purity. However, when opaque image supporting materials are prepared in place of paper, a white pigment such as titanium oxide, zinc oxide, clay or calcium carbonate, barium sulfate may be added to the above-mentioned material, or the above-mentioned materials may be foamed. Furthermore, an opaque image supporting material can be prepared by impregnating a sheet of paper with a resin such as an emulsion of acrylic polymer and then by drying the sheet.

The absorbent swelling layer that can absorb liquids (hereinafter referred to as the swelling layer) can be prepared by a cross-linked polymer which is insoluble in the image removal promoting liquid applied to the image supporting material.

It is preferable that the image removal promoting liquid be a water-based liquid for safety in use. Therefore it is preferable that the swelling layer be prepared from a hydrophilic polymer. Examples of hydrophilic polymers are polymers containing carboxyl group, phosphoric acid group, sulfonic acid group, hydroxyl group, amido group and/or amino group; and polymers containing a polyethylene glycol chain.

Specific examples of such polymers are homopolymers and copolymers of acrylic acid, salts thereof, mathacrylic acid, salts thereof, vinyl alcohol, hydroxymethylmethacrylate, hydroxypropylmethacrylate, acrylamide, N-isopropylacrylamide, N,N-dimethylaminoethylacrylate, N,N-dimethylaminoethylmethacrylate, N,N-dimethylaminopropylacrylamide and vinylpyrrolidone; and polyethylene glycol.

Examples of cross-linking agents for preparing the above-mentioned cross-linked polymers are cross-linking agents having a plurality of unsaturated bonds, such as N,N-methylbisacrylamide; isocyanate cross linking agent; epoxy cross linking agent; and formalin. Examples of cross-linking methods are methods using the above-mentioned cross-linking agents, irradiation methods with application of electromagnetic waves such as electron rays, ultraviolet rays or X-rays, and heating methods.

In the case of the image supporting layer where transparency is required for the swelling layer thereof, for instance, as in the case of OHP sheets, it is preferable that the swelling layer be uniform. However, in the case where opaqueness is required for the image supporting material in place of paper, it is preferable that the swelling layer be formed by dispersing particles of any of the above-mentioned polymers or starch in a binder.

The swelling layer may be provided on one side of the above-mentioned substrate, but it is preferable that the swelling layer be provided on both sides of the substrate, since when the swelling layer is provided on both sides of the substrate, the curling of the image supporting material can be prevented, and the image supporting material can be used without the necessity for identifying the swelling layer provided side of the image supporting material, and the image supporting material can be used more repeatedly than when the swelling layer is provided on one side of the substrate.

It is preferable that the thickness of each swelling layer be 5 μm or less, since when the thickness exceeds 5 μm, the amount of the image removal promoting liquid required for the removal of images is increased, and accordingly the energy and time for drying the swelling layer by evaporating the absorbed image removal promoting liquid after the removal images are also increased. Furthermore, as the thickness of the swelling layer is increased, the swelling layer tends to crack. Therefore the setting of the thickness of the swelling layer is particularly important in the case where transparency is required for the swelling layer thereof, for instance, as in the case of OHP sheets.

It is also preferable that the cross-linking degree of the polymer for use the swelling layer and the kind of image removal promoting liquid be selected in such a manner that the coefficient of the expansion of the swelling layer is 1.5 to 20 times the original size of the swelling layer before the swelling thereof. When the coefficient of the expansion of the swelling layer exceeds 20, the amount of the image removal promoting liquid required for the removal of images is excessive in the same manner as in the case where the swelling layer is too thick. Furthermore, when the coefficient of the expansion of the swelling layer is high, the strength of the swelling layer is low, so that the number of the usable repetition times of the swelling layer is reduced.

In order to make the image supporting material usable after removing the images from the image supporting material, the image supporting material has to be dried. The larger the amount of the image removal promoting liquid applied to the image supporting material, the larger the energy required for drying the image supporting material. Therefore, it is preferable that the amount of the image removal promoting liquid applied to the image supporting material be 2 ml or less per A4 size thereof. Therefore it is preferable that the thickness and the coefficient of expansion of the swelling layer be respectively set in such ranges that a saturated absorption amount of the image removal promoting liquid per A4 size of the swelling layer, which can be calculated from the thickness and the coefficient of the swelling layer, does not exceeds 2 ml. The amount of the image removal promoting liquid applied to the image-bearing side of the image supporting material is set at such an amount that exceeds a maximum amount of the liquid that can be absorbed by the swelling layer. The "amount that exceeds a maximum amount of the liquid that can be absorbed by the swelling layer" means such an amount that exceeds the maximum amount that can be absorbed by the swelling layer within a predetermined application time for applying the image removal promoting liquid, so that the liquid that cannot be absorbed by the swelling layer stays on the surface of the image supporting material. The maximum amount may be affected by the presence of an oil material on the surface of the image supporting material, which is transferred thereto, for instance, from an image fixing roller when images are fixed to the image supporting material.

The image removal promoting liquid applied to the image-bearing side of the image supporting material in an amount that exceeds a maximum amount of the liquid that can be absorbed by the swelling layer is then leveled, so that a liquid film of the image removal promoting liquid with a uniform thickness is formed on the surface of the image supporting material. Thus, the image removal promoting liquid uniformly penetrates the swelling layer.

It is preferable that the image removal promoting liquid for use in the present invention be water or a water-based liquid, which may contain a surfactant, a water-soluble organic material in addition to water. By containing a surfactant in the image removal promoting liquid, the image supporting material, the images formed on the image supporting material, and members such as rollers for supplying or applying the image removal promoting liquid can be uniformly wetted with the image removal promoting liquid. The above-mentioned water-soluble organic compound serves as a dissolving agent for a humectant and/or a surfactant for use in the image removal promoting liquid.

Examples of surfactants for use in the image removal promoting liquid include nonionic surfactants, anionic surfactants, cationic surfactants, and ampholytic surfactants.

Specific examples of nonionic surfactants are polyoxyethylene alkyl ether, polyoxyethylene alkylphenyl ether, polyoxyethylene alkyl ester, polyoxyethylene alkylsorbitan ester, polyoxyethylene alkylamine, glycerin fatty acid ester, decaglycerin fatty acid ester, polyglycerin fatty acid ester, sorbitan fatty acid ester, propylene glycol fatty acid ester, polyethylene glycol fatty acid ester, polyoxyethylene polyoxypropylene alkyl ether, polyoxyethylene polyoxypropylene block polymer, perfluoroalkylphosphoric ester, and polyoxyethylene-modified polydimethylsiloxane.

Specific examples of anionic surfactants are higher fatty acid salt, N-acylamino acid salt, polyoxyethylene alkyl ether carboxylate, acylated peptide, alkyl sulfonate, alkylbenzenesulfonate, alkylnaphthalenesulfonate, monoalkylsulfosuccinate, dialkylsulfosuccinate, α-olefinsulfonate, N-acylsulfonate, alkylsulfate, polyoxyethylene alkyl ether sulfate, polyoxyethylene alkylaryl ether sulfate, alkylamide sulfate, monoalkyl phosphate, dialkyl phosphate, trialkyl phosphate, monopolyoxyethylene alkyl ether phosphate, bispolyoxyethylene alkyl ether phosphate, trispolyoxyethylene alkyl ether phosphate, polyoxyethylene alkylaryl ether phosphate, perfluoroalkyl carboxylate, perfluoroalkyl sulfonate, perfluoroalkenylaryl sulfonate, N-perfluorooctanesulfonyl glutamate, perfluoroalkyl-N-ethylsulfonylglycine salt, 3-(ω-fluoroalkanoyl-N-ethylamino)-1-propanesulfonate, perfluoroalkylethyl phosphoric ester salt, carboxylic-acid-modified polydimethylsiloxane, and sulfonic-acid-modified polydimethylsiloxane.

Specific examples of cationic surfactants are higher alkylamine salt, higher alkyl quaternary ammonium salt, alkylbenzene amine salt, alkylbenzene quaternary ammonium salt, and alkyl heterocyclic quaternary ammonium salt.

Examples of amphoteric surfactants are betaine and aminocarboxylic acid.

Furthermore, it is not always necessary that the image removal promoting liquid comprise a surfactant in order to improve the wettability thereof to the image supporting material and the image forming material. For instance, the same effect as obtained by the addition of the surfactant can be gained when the image removal promoting liquid comprises a water-soluble organic compound, for example, alcohols such as methanol and ethanol, acetone, carbitol and sorbitol.

In order to improve the above-mentioned wettability only by the addition of the above-mentioned water-soluble organic compound to water, the water-soluble organic compound has to be added in an amount of at least 5 wt. % to the entire weight of the image supporting material. However, when any of the above-mentioned surfactants is employed, the wettability can be significantly improved by use of a small amount of the surfactant. Therefore, when an excessive amount of the image removal promoting liquid is applied to the image-bearing side of the image supporting material and dried, the traces of the dried liquid are scarce. For the removal of the image forming material from the image supporting material for which transparency is required, such as OHP sheets, it is easy to maintain the transparency of the image supporting material after recycled. When a solvent with a relatively low boiling point, such as methanol or ethanol, is employed as the above-mentioned organic compound, there is no problem that the traces of the liquid remain, but such solvents are not preferable since they evaporate.

Therefore, it is preferable to use the surfactant in the image removal promoting liquid for use in the present invention. However, particularly when OHP sheets are recycled, it is preferable that the addition of the surfactant be minimized. It is preferable that the amount of the surfactant for use in the image removal promoting liquid be in a range of 0.05 to 20 wt. % of the total weight of the image removal promoting liquid. When the amount of the surfactant is within the above range, the image removal promoting liquid exhibits the above-mentioned wettability sufficiently to the image supporting material and to the image forming material, so that the removal of the images from the image supporting material is facilitated and no traces of the liquid are left on the recycled image supporting material.

Specific examples of other water-soluble organic compounds for use in the image removal promoting liquid are ethylene glycol, diethylene glycol, triethylene glycol, tetraethylene glycol, polyethylene glycol, propylene glycol, dipropylene glycol, glycerin, 1,5-pentanediol, 1,6-hexanediol, and 2-methyl-2,4-pentanediol. It is preferable that the amount of these water-soluble organic compounds added to the image removal promoting liquid be 2.0 wt. % or less to the entire amount of the image removal promoting liquid for the same reasons as in the case of the surfactant to be added to the image removal promoting liquid.

In the recycling method according to the present invention, the swelling layer of the image supporting material to which the image removal promoting liquid is applied, or the liquid film layer of the image removal promoting liquid formed on the image bearing side of the image supporting material is then heated, whereby the image removal promoting liquid is caused to reach the interface between the swelling layer and the image forming material deposited on the swelling layer, and the swelling layer is caused to swell. Thus, the adhesion between the image forming material and the swelling layer is significantly reduced.

After at least part of the liquid which constitutes the above-mentioned liquid film layer reaches the interface between the swelling layer and the image forming material deposited on the swelling layer, the image forming material is softened with the application of heat and pressure thereto, and is caused to adhere to a peeling member, and the peeling member to which the softened image forming material adheres is separated from the image supporting material, whereby the image forming material deposited on the image supporting material is removed from the surface of the image supporting material.

The above-mentioned peeling member serves to peel and transfer the image forming material from the image supporting material and preferably comprises a material which exhibits high adhesiveness to the image forming material. It is also preferable that the peeling member has such properties that do not allow the vapors of the components of the image removal promoting liquid to pass therethrough in order to prevent the evaporation of the components of the image removal promoting liquid.

Examples of the material for use in the peeling member are thermoplastic or thermosetting synthetic resins, for example, synthetic rubbers such as isoprene rubber, neoprene rubber, chloroprene rubber, silicone rubber, butadiene rubber, and fluorine-contained rubber; natural rubbers; epoxy resins such as bisphenol-epichlorohydrin condensation product; alkyd resin; amino resins such as urea-formaldehyde resin, butylurea-formaldehyde resin, butylated melamine-formaldehyde resin, and benzoguanamine formaldehyde resin; heat-hardening phenolic resins such as terpenephenolic resin, phenol ether resin, and phenolic resin; vinyl copolymers such as polyvinyl chloride, polyvinylidene chloride, vinylidene chloride-acrylonitrile copolymer, vinyl chloride-vinyl acetate copolymer, ethylene-vinyl acetate copolymer, ethylene-tetrafluoroethylene copolymer, polyvinylidene fluoride; vinyl copolymer polyvinyl butyral, polyvinyl formal, polypropylene, and polyethylene; acrylic resins such as polybutyl acrylate, polymethacrylic acid, and polymethyl methacrylate; polyimides; polyamides such as 6,6-nylon, and 6-nylon; polycarbonate; polyether sulfone; polyether ether ketone; polyethylene terephthalate; polyethylene naphthalate; polyesters such as aromatic polyester; polyphenylene sulfide; polyparabanic acid; polyether nitrile; and aramid; and metals such as nickel, stainless steel, and aluminum, and metallic oxides; and ceramic materials.

The above-mentioned materials can be used alone, but may be used in a composite form, for example, in a layered form, or in the form of an alloy, or with the addition thereto of an additive such as glass fiber, whisker, carbon, silica, or titanium oxide.

The material for use in the peeling member should be selected depending on the kind of image forming material to be peeled from the image supporting material, and the image removal process to be employed. It is advantageous that the peeling member can be used repeatedly from the viewpoint of the recycling cost. For this purpose, it is required that the material for the peeling member have relatively high heat resistance and surface stability. From the aspects of the image peeling performance and the durability of the peeling member, the following materials are particularly preferred: polyethylene terephthalate, polyethylene naphthalate, polyether ether ketone, polyphenylene sulfide, polyparabanic acid, polyether nitrile, aramid, polyimide, polyetherimide, stainless steel, nickel, and anodized aluminum.

According to the above-mentioned recycling method of the present invention, even in the case where the image removal promoting liquid is difficult to permeate into the swelling layer due to the kind of images formed on the image supporting material, the liquid readily enters the interface between the swelling layer and the image forming material deposited thereon, and the swelling layer is caused to swell, so that the adhesion between the swelling layer and the image forming material is reduced. Thus, the image forming material that constitutes the images can be securely and efficiently removed from the image supporting material.

Furthermore, since the significant reduction in the adhesion between the swelling layer and the image forming material facilitates the removal of the image forming material from the surface of the image supporting material, the jamming of the image supporting material during the transportation thereof can be prevented.

An embodiment of an apparatus for performing the above-mentioned recycling method of the present invention will now be explained in detail. Referring now to the drawings, wherein like reference numerals designate identical or corresponding parts throughout the several views.

FIG. 1 is a schematic cross-sectional view of the embodiment of the recycling apparatus of the present invention.

It is supposed that images are formed on an image supporting material 1 by an electrophotographic image formation apparatus and that the image bearing image supporting material is no longer used.

With reference to FIG. 1, the above-mentioned image bearing image supporting material 1 is manually inserted into the recycling apparatus along a guide plate 2 which serves as a manual paper-feed stacking plate and is then further inserted between the guide plate 2 and a paper-feed roller 3. The paper-feed roller 3 is driven in rotation by a driving apparatus (not shown) when the insertion of the image supporting material 1 into the recycling apparatus is detected by an image support material sensor (not shown), so that the image supporting material 1 is transported into a liquid application section by the friction with the guide plate 2.

The above-mentioned liquid application section comprises a liquid container which holds an image removal promoting liquid 11, a liquid application roller 12 which is roller-shaped and serves as a member for applying the image removal promoting liquid 11 to the image supporting material 1, a squeegee roller 15, and a holding roller 14 which is roller-shaped and serves as a holding member for holding the image supporting material 1.

The liquid application roller 12 may be constructed of, for instance, a so-called photogravure roller having numerous perforations on the surface thereof. When the liquid application roller 12 is constructed of the photogravure roller, the amount of the liquid that can be held by the liquid application roller 12 can be changed by changing the size and/or depth of each perforation formed on the surface thereof. Part of the liquid application roller 12 is disposed so as to be immersed into the image removal promoting liquid 11 as shown in FIG. 1. The liquid application roller 12 is driven in rotation in the same direction as the transport direction of the image supporting material 1, at the same line speed as that of the paper-feed roller 3, by a driving system (not shown).

An excessive image removal promoting liquid 11 applied to the surface of the liquid application roller 12 is removed therefrom by the squeegee roller 15, which is rotated, following the liquid application roller 12. The liquid application roller 12 comes into contact with the image supporting material 1 and applies the image removal promoting liquid 11 to the image supporting material 1 to form a uniform liquid layer on the image bearing side of the image supporting material 1.

The holding roller 14 is constructed of a wheel having projecting points at the outer peripheral circumference thereof, just like a spur, and holds only an edge portion of the image supporting material 1 onto the liquid application roller 12. A holding roller having a smooth surface would not be preferable for use in the apparatus of the present invention, since the image removal promoting liquid 11 is applied to the back side of the image supporting material 1 on which no images are formed.

A peeling section where the image forming material is transferred from and peeled off the image bearing side of the image supporting material 1 to which the above-mentioned image removal promoting liquid 11 is applied, comprises a heating drum 21 which is made of a metal and in which a heater 22 such as a halogen lamp heater is built, a pressure application roller 27 serving as a pressure application member, an inlet roller 23, a separation roller 24 which constitutes a separation section, a tension roller 25, a back-up roller 26 for cleaning, and an endless-belt-shaped peeling member 28 which is trained over the rollers 23, 24, 25 and 26. The rollers 23, 24, 25 and 26 are disposed in touch with the inside of the peeling member 28 as shown in FIG. 1.

The separation roller 24 may be modified so as to function as the above-mentioned pressure application roller 27 as well.

The above-mentioned heating drum 21 and the peeling member 28 constitute a pair of holding and transport members which hold therebetween the image supporting material 1 to which the image removal promoting liquid 11 is applied and transport the image supporting material 1.

The above-mentioned pressure application roller 27 is a metallic roller with the surface thereof being coated with an elastic material such as silicone rubber. The pressure application roller 27 is disposed so as to bring the peeling member 28 into pressure contact with the surface of the heating drum 21 on a holding and transport path which starts from a holding initiation position where the above-mentioned inlet roller 23 is disposed to a holding termination position where the above-mentioned separation roller 24 is disposed.

In the embodiment shown in FIG. 1, the above-mentioned endless belt serves as the peeling member, but the heating drum 21 may be used as the peeling member. In order to remove the image forming material from both sides of the image supporting material 1 at the same time by image transfer and peeling, the endless belt and the heating drum 21 may be used as the peeling member.

The heater 22 which is built in the above-mentioned heating drum 21 heats (a) the swelling layer of the image supporting material 1 which is held between the peeling member 28 and the heating roller 21, (b) the liquid layer deposited on the image supporting material 1 and also (c) the image forming material on the image supporting material 1. In order to heat the swelling layer of the image supporting material 1 effectively, it is preferable that the heating member be built in the heating drum 1 which comes into contact with the image supporting material 1 as in the embodiment shown in FIG. 1.

Apart from the heating member built in the heating drum 21, a heater may be built in the pressure application roller 27, or a heating lamp may be provided for heating the peeling member 28.

The heating drum 21 is driven in rotation in the direction of the arrow by driving means (not shown). The pressure application roller 27 is urged against the heating drum 21 by urging means such as spring and oil-pressure apparatus (not shown), and a nip is formed between the pressure application roller 27 and the heating drum 21.

The tension roller 25 is constructed so as to apply a predetermined tension to the peeling member 28 by urging means such as spring and oil-pressure apparatus (not shown).

The image supporting material 1, with the image removal promoting liquid 11 being applied to the image bearing side thereof in the above-mentioned liquid application section to form a liquid film layer thereon, is inserted between the heating drum 21 and the peeling member 28 near the inlet roller 23, and the image bearing side of the image supporting material 1 is superimposed on the peeling member 28, and held between the heating drum 21 and the peeling member 28.

The image supporting material 1 which holds thereon the liquid film layer composed of the image removal promoting liquid 11 in an excessive amount is heated by the heating drum 21 in the holding and transport path from the inlet roller 23 to the separation roller 24.

Thus, the image forming material in the form of a film deposited on the image supporting material 1 is heated until the image forming material is softened and at the same time, the swelling layer or the liquid film on the image supporting material 1 is also heated, so that the image removal promoting liquid 11 which constitutes the liquid film speedily permeates the interface between the swelling layer and the image forming material deposited on the swelling layer.

The image removal promoting liquid 11 which permeates the above-mentioned interface swells the swelling layer and significantly reduces the adhesion between the image forming material and the swelling layer of the image supporting material 1.

With reference to FIGS. 2(*a*) to 2(*d*), a process of the reduction of the adhesion between the above-mentioned image forming material and the image supporting material 1 will now be explained.

In FIG. 2(*a*), the image supporting material 1 comprises a substrate 101 and a pair of swelling layers 102 and 103, one of which is provided on one side of the substrate 101, and the other of which is provided on the other side of the substrate 101. Thin film-shaped images 104 are deposited on the swelling layer 102. When the image removal promoting liquid 11 is applied to the image supporting material 1, the image supporting material 1 is in such a state as shown in FIG. 2(*b*).

As shown in FIG. 2(*b*), an image-free portion 102*a* of the swelling layer 102 on the image bearing side of the image supporting material 1 swells with the absorption of the image removal promoting liquid 11, while an image-bearing portion 102*b* of the swelling layer 102 under the image forming material which constitutes the images 104 scarcely absorbs the image removal promoting liquid 11, or the absorption of the image removal promoting liquid 11 by the image-bearing portion 102*b* of the swelling layer 102 is so small that the adhesion between the image forming material and the image supporting material 1 is not sufficiently reduced. This is because the image forming material composed of a hydrophobic resin or wax, such as toner for use in electrophotography or a thermal image transfer ink, hardly allows an aqueous image removal promoting liquid to pass, so that the image removal promoting liquid 11 is difficult to reach the image bearing portion 102*b* of the swelling layer 101.

When the substrate 1 of the image supporting material 1 is made of a material which absorbs the image removal promoting liquid 11 or through which the image removal promoting liquid 11 passes, such as paper, the image removal promoting liquid 11 permeates the image-bearing portion 102*b* of the swelling layer 102 under the image forming material to some extent. However, when the swelling layer 102 is as thin as 5 $\mu$m or less, the image removal promoting liquid 11 does not pass through the image forming material, so that it is difficult for the image promoting liquid 11 to permeate the image-bearing portion 102*b* of the swelling layer 102 under the image forming material through the image-free portion 102*a* of the swelling layer 102.

The image supporting material 1, with the image removal promoting liquid 11 being applied to the image bearing side thereof in the liquid application section, is held and heated between the heating drum 21 and the peeling member 28, whereby the permeation of the water in the image removal promoting liquid 11 through the image-free portion 102*a* of the swelling layer 102 or the image forming material is facilitated. It is presumed that this is because the water deposited on the surface of the image supporting material 1 is vaporized to be almost in a molecular state. The surface of the image supporting material 1 is covered with the peeling member 28 through which the water vapor is difficult to pass, so that the water vapor is absorbed by the image-free portion 102*a* of the swelling layer 102. The image-free portion 102*a* of the swelling layer 102 which absorbs the water is heated. The substrate 101 is also made of a material through which the water vapor is difficult to pass, so that the evaporation of water from the image-free portion 102*a* of the swelling layer 102 is hindered. Thus, by superimposing the peeling member 28 which is made of the material through which the vapor of the image removal promoting liquid 11 does not pass on the image supporting material 1 to which the image removal promoting liquid 11 is applied in an excessive amount, and by heating the superimposed peeling member 28 and image supporting material 1, the image removal promoting liquid 11 is absorbed by the image-bearing portion 102*b* of the swelling layer 102 under the image forming material, so that the image-bearing portion 102*b* of the swelling layer 102 swells.

Due to the swelling of the image-bearing portion 102*b* of the swelling layer 102, the adhesion between the image forming material which constitutes the images 104 and the image supporting material 1 significantly reduces, so that the image forming material can be easily removed from the surface of the image supporting material 1.

According to the present invention, a predetermined amount of the image removal promoting liquid 11 can be applied to the image supporting material 1, and the swelling layer 102 or the liquid layer can be heated, whereby the image removal promoting liquid 11 is effectively caused to permeate the image-bearing portion 102*b* of the swelling layer 102 under the image forming material which constitutes the above-mentioned images 104, and accordingly the image-bearing portion 102*b* of the swelling layer 102 can be swollen, whereby the removal of the image forming material from the image supporting material 1 can be performed at high speed.

Even in the case where the image supporting material 11 bears a large solid image thereon, the image-bearing portion 102*b* of the swelling layer 102 under the image forming material which constitutes the large solid image can absorb the image removal promoting liquid 11, so that such a large solid image can be easily removed from the image supporting material 1. Furthermore, even if the above-mentioned solid image is almost free from perforations, the image forming material which constitutes the solid image can be removed. Therefore, images with various patterns recorded by a variety of commercially available image formation apparatus can also be removed.

When the amount of the image removal promoting liquid 11 applied to the image supporting material 1 in the liquid application section is such that the applied image removal promoting liquid 11 is absorbed in its entirety by the image supporting material 1, so that no liquid layer of the image removal promoting liquid 11 is formed on the image-bearing side of the image supporting material 1, the image-bearing portion 102*b* of the swelling layer 102 under the image forming material cannot be sufficiently swollen by the image removal promoting liquid 11, and accordingly it is difficult to remove the image forming material from the image supporting material 1. In particular, when the image formed on the image supporting material 1 is a large solid image or an image composed of a closely packed image forming material in the form of a thin film free from perforations, the image removal promoting liquid 11 hardly permeates the image-bearing portion 102*b* of the swelling layer 102 under the image forming material, so that it is difficult to reduce the adhesion between the image forming material and the image supporting material 1.

The amount of the image removal promoting liquid 11 that permeates the image-bearing portion 102*b* of the swelling layer 102 under the image forming material can be increased by increasing a period of time in which the image removal promoting liquid 11 is in contact with the image supporting material 1 in the liquid application section. However, it takes a considerably long period of time for the image removal promoting liquid 11 to permeate the image-bearing portion 102*b* of the swelling layer 102 under the image forming material at room temperature, so that the recycling speed is significantly decreased. Furthermore, a large size apparatus is required to increase the contact time in which the image removal promoting liquid 11 is in contact with the image supporting material 1 in the liquid application section. Such a large size apparatus is not practical. Therefore, it is indispensable to form a liquid layer of the image removal promoting liquid 11 on the image supporting material 1 and to heat the liquid layer in a recycling apparatus for use in practice.

The longer the heating path in the holding and transport path in the above-mentioned peeling section, the greater the heating effect. However, it is difficult to completely prevent the evaporation of the image removal promoting liquid 11. Therefore it is preferable to set the length of the heating path in the holding and transport path in the range of 10 to 1000 mm. The above-mentioned heating path may be appropriately selected in view of the desired recycling speed, the properties of the image forming material to be removed, and the state of the adhesion of the image forming material to the image supporting material 1. It is particularly preferable to set the heating path at 20 to 250 mm when images formed by conventional electrophotography in general use are removed at a line speed of 10 to 120 mm/sec.

In the above-mentioned peeling section, the image forming material which constitutes the images formed on the image supporting material 1 is heated up to a temperature above the softening point of the image forming material by the heating drum 21 as mentioned above, with an on-off control of the heater 22, before the image forming material reaches the pressure application roller 27. The heating temperature for the image forming material is appropriately selected in accordance with the viscoelasticity of the image forming material to be employed. When a dry toner for electrophotography in general use is used as the image forming material, it is preferable to set the heating temperature in such a manner that the image supporting material 1 is heated to 60 to 130° C., more preferably to 70 to 110° C. When the heating temperature is lower than the above-mentioned preferable range of 60 to 130° C., the image forming material lacks fluidity, so that the image forming material does not adhere to the peeling member, and therefore the transfer and peeling of the image forming material tends to become difficult, while when the heating temperature is higher than the above-mentioned preferable range of 60 to 130° C., the fluidity of the image forming material tends to become excessive, so that the image forming material is ruptured when the peeling member 28 is separated from the image supporting material 1, and accordingly, it becomes difficult to remove the image forming material completely from the image supporting material 1. When appropriate fluidity is obtained by heating the image supporting material 1 to a temperature in the above-mentioned range, pressure is applied to the image forming material and the peeling member 28 by the pressure application roller 27, whereby an appropriate adhesion can be generated between the image forming material and the peeling member 28.

The peeling member 28 and the image supporting material 1 to which pressure is applied by the above-mentioned pressure application roller 27 are separated in the separating section in which the separating roller 24 is disposed. This separation is caused because the peeling member 28 is transported along the separating roller 24, while the image supporting material 1 tends to keep straight on due to its rigidity. When the adhesion between the image supporting material 1 and the image forming material is not sufficiently reduced, it is difficult to separate the peeling member 28 from the image supporting material 1.

However, in the embodiment of the present invention, the image removal promoting liquid 11 is applied to the image supporting material 1 in an excessive amount that cannot be absorbed by the swelling layer 102, and the applied image removal promoting liquid is leveled to form a uniform liquid layer on the image supporting material 1 and then heated, whereby the adhesion between the image supporting material 1 and the peeling member 28 is sufficiently reduced, and accordingly the separation of the peeling member 28 from the image supporting material 1 is facilitated and the possibility of occurrence of improper transport or jamming of the image supporting material 1 is minimized.

In the above peeling section, the image forming material is transferred from the image supporting material 1 to the peeling member 28, and the image forming material transferred to the peeling member 28 is cooled by a cooling fan 34 and then removed from the peeling member 28 by a cleaning member 31, so that the peeling member 28 can be used repeatedly.

The image forming material is heated by the heating drum 21 so that the viscosity thereof is decreased and accordingly the fluidity thereof is increased. The above-mentioned cooling fan 34 cools the image forming material in the above-mentioned state until the aggregation force of the image forming material becomes greater than the adhesion between the image forming material and the peeling member 28, whereby the removal of the image forming material from the peeling member 28 by the cleaning member 31 is facilitated.

Alternatively, the distance from the separation position for the image supporting material 1 to the cleaning position by the cleaning member 31 may be set at such a distance that the image forming material is subjected to natural cooling within the distance to the extent that the aggregation force of the image forming material becomes greater than the adhesion between the image forming material and the peeling member 28.

The structure provided with the cooling fan 34 for forced cooling as in the recycling apparatus as shown in FIG. 1 has the advantage over the structure for performing the above-mentioned natural cooling that the image forming material transferred to the peeling member 28 can be cooled to the desired temperature even when the distance from the separation position for the image supporting material 1 to the cleaning position by the cleaning member 31 is shorter than the distance in the structure for performing the above-mentioned natural cooling.

As the above-mentioned cleaning member 31, there can be preferably employed a roller provided with spiral blades and a roller having a scrubbing-brush like surface around which loop-shaped metal wires, or organic polymer wires are wound. However, it is not always necessary to use a rotatable roller as the cleaning member 31, but the peeling member 28 can be cleaned by a fixed blade. An image forming material 33 removed from the peeling member 28 by the above-mentioned cleaning is placed in a container 32 and appropriately disposed of thereafter.

The image supporting material 1 to which heat and pressure are applied in the above-mentioned peeling section is then separated from the peeling member 28 by pick-off pawls 45*a* and 45*b*, transported onto a guide plate 44 by discharge rollers 42 and 43, and then discharged onto a tray 46 on which the image supporting material 1 is stacked.

The guide plate 44 comprises a surface portion, and at least the surface portion thereof is made of a soft and absorbent material which does not scratch the surface of the image supporting material 1 and is capable of absorbing liquids. Examples of the material for the surface portion of the guide plate 44 are felt, cloth, and sponge. An excessive image removal promoting liquid which remains on the image supporting material 1 is absorbed by the guide plate 44. Thus, the guide plate 44 serves as means for removing residual materials which stay on the image supporting material 1. When the amount of the image removal promoting liquid 11 which remains on the image supporting material 1 is such that the liquid 11 cannot be absorbed by the guide plate 44, a heater may be provided near the guide plate 44 to dry the surface of the guide plate 44.

When the image supporting material 1 is moved over the guide plate 44, the pressure applied by the discharge rollers 42 and 43 to the guide plate 44 is adjusted by pressure adjustment means (not shown) in such a manner that residual materials which remain on the surface of the image supporting material 1 can be removed therefrom by the friction between the image supporting material 1 and the guide plate 44. Examples of the residual materials which remain on the surface of the image supporting material 1 are image forming materials released from markers, pencils and ball-point pens, and finger print materials.

When cleaning the back side of the image supporting material 1 opposite to the image bearing side thereof, it is preferable that the peripheral surface portion of each of the discharge rollers 42 and 43 be made of a soft and absorbent material which does not scratch the back side surface of the image supporting material 1 and is capable of absorbing liquids, such as felt, cloth, or sponge, and that the rollers 42 and 43 be rotated at different peripheral line speeds so that the back side of the image forming material 1 is rubbed by the surfaces of the rollers 42 and 43. It is also preferable that the soft material, such as felt, cloth or sponge, attached to the surface portions of the rollers 42 and 43 be easily detachable in order to replace the soft material with a clean soft material when the soft material becomes dirty.

There may be a risk that the image removal promoting liquid 11 spills from the container 13 when such a recycling apparatus is slanted, for instance, during the transportation thereof. However, in the recycling apparatus as shown in FIG. 1, there is provided a liquid absorbing pad 51 which contains a gelatinizing agent right under the container 13 at the bottom of this apparatus within housings 61 and 62 thereof. The liquid absorbing pad 51 is of a small size and light-weighted, and capable of absorbing a large quantity of the liquid, so that in comparison with a recycling apparatus provided with an extra container for catching the spilt liquid, the recycling apparatus of the present invention can be made at a lower cost and in a smaller size. The amount of the liquid that can be absorbed by the gelatinizing agent of the liquid absorbing pad 51 largely depends upon the composition of the liquid. The image removal promoting liquid 11 for use in the recycling apparatus of the present invention is mostly composed of water. Therefore, the amount of the image removal promoting liquid 11 that can be absorbed by the gelatinizing agent is large and therefore, the use of the liquid absorbing pad 51 containing the gelatinizing agent is significantly effective in the present invention.

In the recycling apparatus shown in FIG. 1, the image supporting material 1 is manually inserted into the recycling apparatus along the guide plate 2 onto the paper-feed roller 3. In this case, when the image supporting material 1 is inserted inside out by mistake, there is the risk that the heated and softened image forming material adheres to the surface of the heating drum 21.

When the image supporting material 1 adheres to the surface of the heating drum 21, the image supporting material 1 is not separated from the heating drum 21 near the separation roller 24, so that improper transportation or jamming of the image supporting material 1 takes place. In order to effectively prevent or avoid such a trouble, it is preferable that the surface of the heating drum 21 be coated with a material which is difficult to adhere to the image forming material, for instance, a fluorine-based material such as polytetrafluoroethylene. However, when the image supporting material 1 is inserted inside out as mentioned above, the image forming material can be removed only from one side of the image supporting material 1 as shown in FIG. 1. Therefore, in order to recycle the image supporting material 1, it is necessary to insert the image supporting material 1 discharged onto the tray 46 into the recycling apparatus once again.

In the case where the image supporting material 1 is a transparent sheet, when the stacking surface of the guide plate 2 serving as a manual stacking plate, with which the image supporting material 1 comes into contact, is colored with a contrast by which the image bearing side of the image supporting material 1 can be recognized, the above-mentioned mistake of stacking the image supporting material 1 inside out can be prevented to some extent. For instance, when the image forming material is black, if the stacking surface of the guide plate 2 is colored white or lightly colored, the above-mentioned mistake could be avoided. This is because when the image supporting material 1 is transparent, and the stacking surface of the guide plate 2 is colored white or lightly colored, the images formed on the image supporting material 1 can be easily recognized and accordingly the right side or wrong side stacking of the image supporting material 1 can be easily seen by the operator.

In case a sheet which is not provided with the swelling layer is used as the image supporting material 1 and inserted into the recycling apparatus, even when the image removal promoting liquid 11 is applied to the sheet, the reduction of the adhesion between the image forming material and the sheet is so small that the sheet adheres to the peeling member 28 and the sheet is not separated from the peeling member 28 near the separation roller 24. As a result, there is the risk that the jamming of the sheet takes place in the course of the transportation thereof.

Such jamming can be effectively avoided by place a mark indicating that recycling is possible on an image supporting material provided with the swelling layer.

By coloring white or lightly at least a portion of the guide plate 2 with which the image supporting material 1 comes into contact, the above-mentioned mark can be easily recognized and therefore the operation error of introducing the image supporting material that cannot be recycled can be avoided.

In the recycling apparatus as shown in FIG. 1, the image removal promoting liquid 11 is applied to the image supporting material 1 by transferring the image removal liquid 11 thereto from the liquid application roller 12 which carries thereon the image removal promoting liquid 11 in the liquid application section.

In the liquid application section, other liquid application methods such as an immersion method and a jet flow method can also be employed. However, in the case of the image supporting material composed of the non-absorbent substrate which absorbs no liquids and the absorbent swelling layer which is overlaid on the non-absorbent substrate, the adhesion between the image forming material and the image supporting material is more considerably lowered when the swelling layer is swollen in comparison with an image supporting layer composed of paper.

Therefore, the immersion method or the jet flow method is employed for the image supporting material composed of the non-absorbent substrate which absorbs no liquids and the absorbent swelling layer which is overlaid on the non-absorbent substrate, part of the image forming material is detached from the image supporting material in the course of the movement of the image supporting material or the jet flow of the liquid in the liquid application section. In particular, when the image areas are small, the image forming material easily comes off the image supporting material. As a result, the image removal promoting liquid is easily contaminated with the image forming material when the immersion method or the jet flow method is employed. Accordingly the contaminated image removal promoting liquid has to be frequently replaced with a clean image removal promoting liquid or there has to be disposed some means for removing the image forming material from the image removal promoting liquid.

In contrast, as in the recycling apparatus as shown in FIG. 1, in which the image removal promoting liquid 11 is applied to the image supporting material 1 by the liquid application roller 12 which carries thereon the image removal promoting liquid 11, an approximately predetermined amount of the image removal promoting liquid 11 is constantly transferred to the image supporting material 1, and the contact time in which the image supporting material 1 is in contact with the image removal promoting liquid 11 in the liquid application section is so short that the image removal promoting liquid 11 is scarcely contaminated with the image forming material. Therefore it is unnecessary to frequently replace the image removal promoting liquid 11 with a clean image removal promoting liquid or to dispose means for removing the image forming material from the image removal promoting liquid 11.

Figure 3:
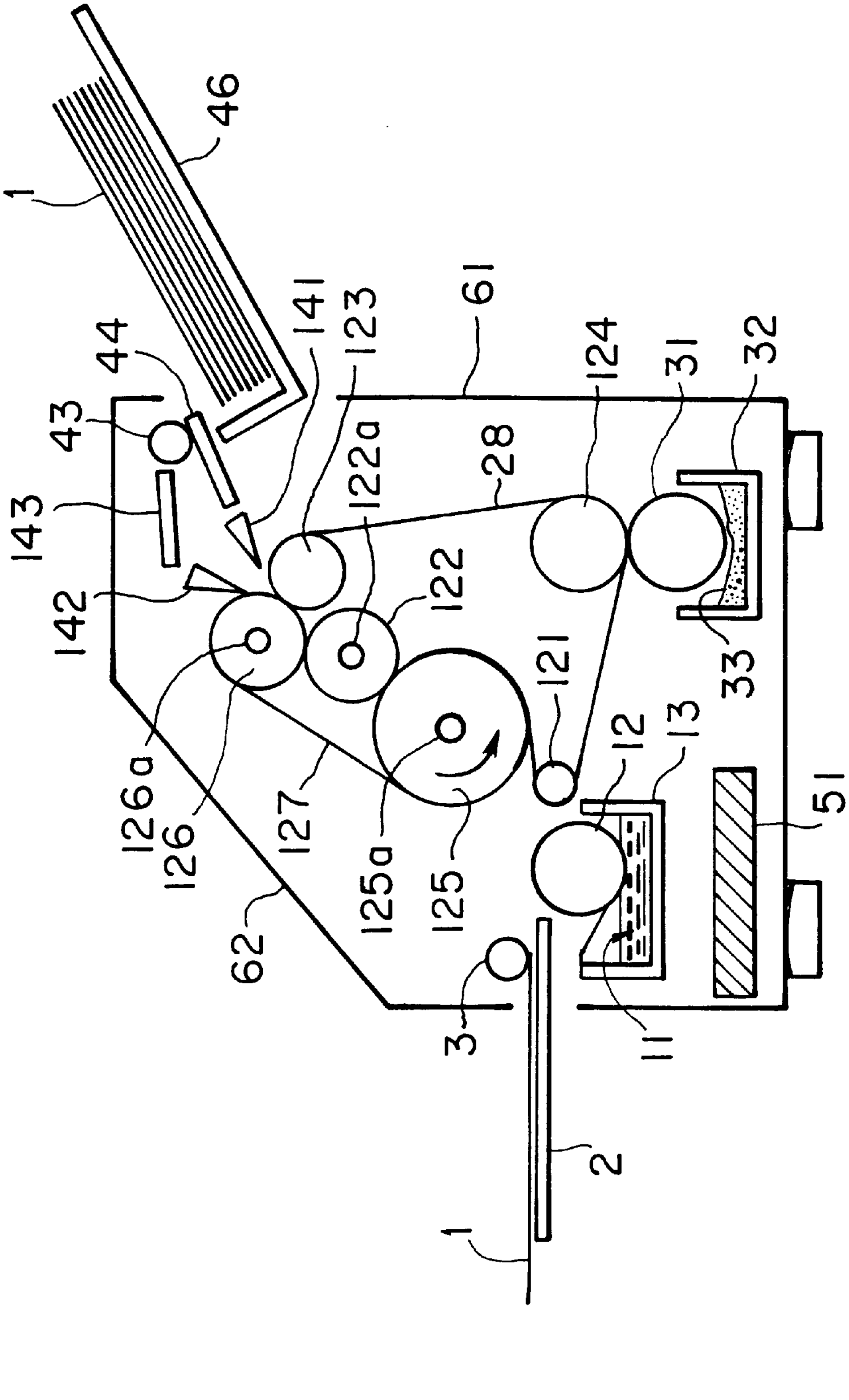
FIG. 3 is a schematic cross-sectional view of another embodiment of an apparatus for recycling image supporting materials according to the present invention.

FIG. 3 is a schematic cross-sectional view of another embodiment of an apparatus for recycling image supporting materials according to the present invention. In the recycling apparatus shown in FIG. 3, the heating drum 21 in FIG. 1 is replaced by an endless back-up belt 127. The back-up belt 127 and the endless-belt shaped peeling member 28 constitute a pair of holding and transport members. The back-up belt 127 is trained over a heating roller 125 with an inner heater 125*a* and a heating roller 126 with an inner heater 126*a* in such a manner the inside of the back-up belt 127 is in contact with the heating roller 125 and the heating roller 126.

A heating and pressure application roller 122 with an inner heater 122*a* and a pressure application and separation roller 123 are in pressure contact with the outside surface of the back-up belt 127 as shown in FIG. 3.

The endless-belt shaped peeling member 28 is trained over an inlet roller 121, the heating and pressure application roller 122, the pressure application and separation roller 123, and a back-up roller 124 in such a manner that the inside of the endless-belt shaped peeling member 28 is in contact with the inlet roller 121, the heating and pressure application roller 122, the pressure application and separation roller 123, and the back-up roller 124. The heating rollers 125 and 126 are in pressure contact with the outside of the endless-belt shaped peeling member 28.

In the recycling apparatus as shown in FIG. 3, the image supporting material 1 to which an excessive amount of the image removal promoting liquid 11 is applied to form a liquid film layer on the image supporting material 1 is held between the back-up belt 127 and the peeling member 28 near the inlet roller 121 and then transported to a position near the pressure application and separation roller 123. During this transportation, the image supporting material 1 is tightly held between the back-up belt 127 and the peeling member 28, with the evaporation of the applied image removal promoting liquid 11 being suppressed, and heated by the heating roller 125, the heating and pressure application roller 122, and the heating roller 126. The heating and pressure application roller 122 brings the back-up belt 127 and the peeling member 28 into pressure contact with each other in the area between the heating roller 125 and the heating roller 126. The pressure application and separation roller 123 brings the back-up belt 127 and the peeling member 28 into pressure contact with each other between the heating roller 126 and the pressure application and separation roller 123.

One of the advantages of the recycling apparatus as shown in FIG. 3, in which the image supporting material 1 is transported and heated, while being held between the two endless belts, is that the heating path and the curvature thereof can be set almost as desired. When a material having a relatively low heat resistant temperature, such as polypropylene, is used as the material for the substrate of the image supporting material 1, if the material is continuously heated, while curved only in one direction, the material may be thermally deformed in accordance with the set curvature. In order to prevent such thermal deformation, it is preferable that the image supporting material 1 be transported while heated along a zigzag path as in the recycling apparatus as shown in FIG. 3.

In the recycling apparatus as shown in FIG. 3, the image supporting material 1 to which heat and pressure have been applied is separated from the peeling member 28 and the back-up belt 127 by pick-off pawls 141 and 142, and is then transported onto a guide plate 44 serving as residual material removing means, while guided by a guide plate 143, and discharged onto a tray 46 by a discharge roller 43.

In each of the above-mentioned embodiments of the recycling apparatus of the present invention, it is preferable that the image removal promoting liquid 11 be applied to the image supporting material 1 in such a manner that the applied amount of the image removal promoting liquid 11 to the image supporting material 1 is decreased as the tailing edge of the image supporting material 1 draws near the liquid application roller 12. By applying the image removal promoting liquid 11 to the image supporting material 1 in the above-mentioned manner, the image removal promoting liquid 11 applied to the image supporting material 1 is prevented from spilling in the recycling apparatus during the transportation of the image supporting material 1 by being held and squeezed between the heating drum 21 and the peeling member 28 or between the back-up belt 127 and the peeling member 28.

In order to carry out this, for instance, it is preferable that a liquid absorbing member made of, for example, a sponge, which is capable of absorbing part of the image removal promoting liquid carried on the above-mentioned liquid application roller 12, is brought into contact with the liquid application roller 12 and the contact area of the liquid absorbing member with the liquid application roller 12 is made variable.

Other features of this invention will become apparent in the course of the following description of exemplary embodiments, which are given for illustration of the invention and are not intended to be limiting thereof.

EXAMPLE 1

A solution of the following formulation was heated in a stream of nitrogen, whereby a polymer solution was obtained:

| | wt. % |
|---|---|
| Acrylic acid | 5 |
| Methacrylic acid | 5 |
| Hyroxyethyl acrylate | 5 |
| Initiator | 0.2 |
| Solvent | balance |

To the above polymer solution, an epoxy cross-linking agent was added in an amount of 0.8 wt. % of the entire weight of the polymer solution at room temperature, and the mixture was mixed, whereby a resin solution was obtained.

A 100 μm thick polyethylene terephthalate film to be used as a substrate was treated with a coupling agent, whereby an undercoat layer was formed on both sides of the polyethylene terephthalate film in order to improve the adhesiveness to the above prepared resin solution.

The above prepared resin solution was then coated on the undercoat layer on both sides of the polyethylene terephthalate film and dried at 120° C., whereby a 0.7 μm thick cross-linked swelling layer was formed on each side of the polyethylene terephthalate film.

Thus, a transparent image supporting material 1 that can be used repeatedly was prepared.

An image was formed on one side of the thus prepared transparent image supporting material 1, using a commercially available copying machine (Trademark "FT6500" made by Ricoh Company, Ltd.).

An image removal promoting liquid 11 was prepared with the following formulation:

| | wt. % |
|---|---|
| Sodium alkylsulfo-succinate (surfactant) | 0.3 |
| Diethylene glycol | 0.12 |
| Glycerin | 0 12 |
| Water | balance |

The thus prepared image removal promoting liquid 11 was placed in the liquid container 13 of the recycling apparatus shown in FIG. 1.

The image bearing transparent image supporting material 1 was subjected to the recycling treatment under the conditions that the recycling line speed was set at 40 mm/sec, the surface temperature of the heating drum 21 was set at 110° C., the length of the heating path was set at 150 mm, and the image removal promoting liquid was applied to the image bearing transparent image supporting material in an amount of 0.3 ml/A4.

As a result, the image forming material deposited on the surface of the image supporting material 1 was completely removed from the image supporting material 1 and the transparency of the image supporting material 1 was almost the same as that before use and therefore the thus recycled image supporting material 1 can be sufficiently used as an OHP sheet.

The image removal promoting liquid 11 was then applied to the transparent image supporting material 1 on which no images were formed (which is referred to as the image-free transparent image supporting material 1) in an amount of 0.3 ml/A4. The image removal promoting liquid 11 stayed on the surface of the image-free transparent image supporting material 1 in the form of a liquid layer, without completely being absorbed by the swelling layer of the image-free transparent image supporting material 1.

The above indicates that the application amount of 0.3 ml/A4 of the image removal promoting liquid 11 is such an amount that exceeds a maximum or saturation amount of the image removal promoting liquid 11 that can be absorbed by the swelling layer.

When it is assumed that the swelling layer has a thickness of 0.7 $\mu$m and a specific density of about 1, and that a saturated absorption amount of the image removal promoting liquid 11 by the swelling layer is 0.3 ml/A4, that is, about 0.3 g/A4, the swelling ratio of the swelling layer is calculated about 7.9. However, as mentioned above, since the image removal promoting liquid 11 stayed on the surface of the image-free transparent image supporting material 1 in the form of a liquid layer, without completely being absorbed by the swelling layer of the image-free transparent image supporting material 1, the actual swelling ratio of the swelling layer is assumed to be less than the above calculated value of about 7.9.

COMPARATIVE EXAMPLE 1

The recycling apparatus shown in FIG. 1 was modified by changing the size of the perforations formed on the surface of the liquid application roller 12 in such a manner that the image removal promoting liquid 11 was applied in an amount of 0.12 ml/A4 to one side of the image supporting material 1 prepared in Example 1.

The image supporting material 1 was subjected to the same recycling treatment as in Example 1 except that the amount of the image removal promoting liquid 11 applied to the image supporting material 1 was changed as mentioned above.

The result was that only about 30% of the image forming material was transferred to the peeling member 28, and therefore, the image supporting material 1 was not obtained in a usable state.

When the image removal promoting liquid 11 was applied in an amount of 0.12 ml/A4 to one side of the image supporting material 1, no image removal supporting liquid 11 remained on the surface of the image supporting material 1.

It is considered that the above-mentioned imperfect removal of the image forming material from the surface of the image supporting material 1 is caused by the state of the application of the image removal promoting liquid 11 as shown in FIG. 2(*d*), in which the image removal promoting liquid 11 is absorbed only by an image-free portion of the swelling layer and therefore even if the peeling member 28 is superimposed on the image supporting material 1 and heat is applied thereto, the adhesion between the image forming material and the image supporting material 1 cannot be reduced sufficiently.

When it is assumed that the swelling layer has a thickness of 0.7 $\mu$m and that a saturated absorption amount of the image removal promoting liquid 11 by the swelling layer is 0.12 ml/A4, the swelling ratio of the swelling layer is calculated about 3.7. However, since the image removal promoting liquid 11 is not absorbed by the swelling layer up to the saturated absorption amount, the actual swelling ratio of the swelling layer is assumed to be more than the above calculated value of about 3.7.

COMPARATIVE EXAMPLE 2

Figure 4:
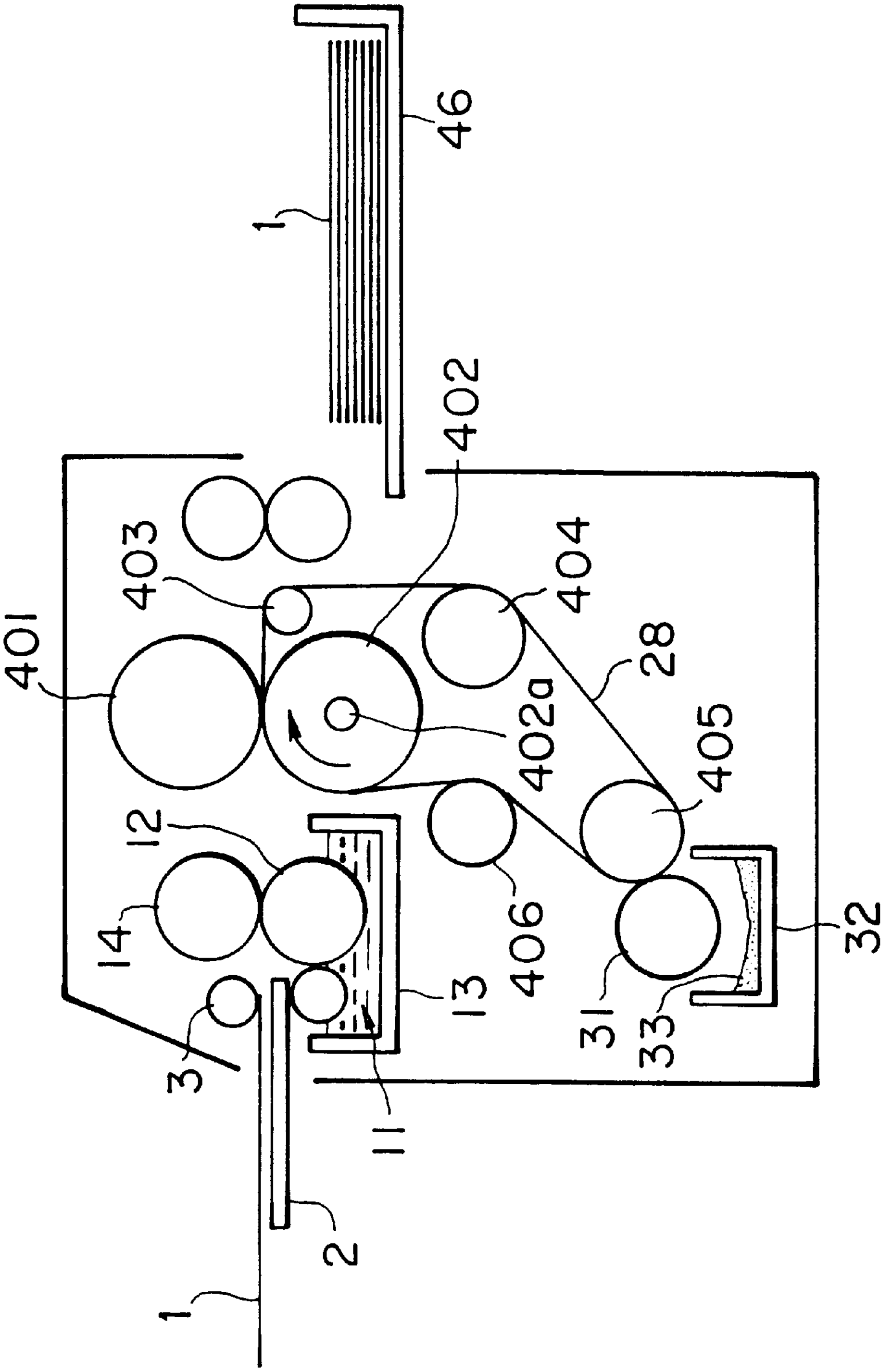
FIG. 4 PRIOR ART
FIG. 4 is a schematic cross-sectional view of a conventional apparatus for recycling image supporting materials.

As illustrated in FIG. 4, a recycling apparatus was constructed in such a manner that the image supporting material 1 was heated only at a nip with a nip width of 5 mm formed by a heating roller 402 with an inner heater 402*a* and a pressure application roller 401.

In this recycling apparatus, the endless-belt shaped peeling member 28 was trained over the heating roller 402, a separation roller 403, and supporting rollers 404 and 405. A predetermined tension was applied to the peeling member 28 by a tension application roller 406.

The same image supporting material 1 as prepared in Example 1 was subjected to the recycling treatment under the same conditions as in Example 1 except that the recycling apparatus employed in Example 1 was replaced by the above-mentioned recycling apparatus as shown in FIG. 4.

The result was that no image forming material was removed from the image supporting material 1.

In order to determine the optimum conditions for the transfer and peeling of the image forming material from the image supporting material 1, the temperature of the heating roller 402 was changed in a range of 70 to 190° C., and it was discovered that the optimum temperature for achieving the best transfer and peeling of the image forming material from the image supporting material 1 was determined to be 150° C.

However, even when the temperature of the heating roller 402 was set at 150° C., the transfer ratio of the image forming material from the image supporting material 1 to the peeling member 28 was about 20%.

From these results, it was confirmed that even when the image removal promoting liquid 11 is applied to the image supporting material 1 in such an amount that some of the image removal promoting liquid 11 remains on the surface of the image supporting material 1, the image forming material removal performance is significantly lowered without the step of heating the image supporting material 1 with the application of the image removal promoting liquid 11 prior to the application of pressure thereto.

COMPARATIVE EXAMPLE 3

The same recycling treatment as in Comparative Example 2 was conducted, using the same image supporting material and the same recycling apparatus as in Comparative Example 2, except that the recycling line speed and the heating temperature were changed.

As a result, it was confirmed that the image forming material can be completely removed from the image supporting material 1 when the recycling line speed was set at 8 mm/sec or less.

This result indicates that the reason why the recycling was successfully performed in Example 1 at the recycling line speed of 40 mm/sec is that the image supporting material 1 was heated under the condition that an excessive amount of the image removal promoting liquid 11 was being applied.

COMPARATIVE EXAMPLE 4

The recycling apparatus shown in FIG. 1 was modified by replacing the roller type liquid application section shown in FIG. 1 with an immersion type liquid application section.

The image supporting material 1 was subjected to the same recycling treatment as in Example 1 except that the roller type liquid application section shown in FIG. 1 was replaced with the immersion type liquid application section as mentioned above.

The result was that the image forming material was completely removed from the image supporting material 1. However, the image removal promoting liquid 11 was contaminated with the image forming material. It was considered that this was because the adhesion between images with small image areas and the image supporting material 1 was readily reduced in the immersion type liquid application section, so that the image forming material was speedily removed from the image supporting material 1.

Therefore, when the above-mentioned immersion type liquid application section is employed or a similar immersion method is employed, it is necessary to replace the image removal promoting liquid 11 with a clean image removal promoting liquid quite often.

EXAMPLE 2

Transparent image supporting materials 1 were prepared in the same manner as in Example 1.

An image was formed on one side of each of the thus prepared transparent image supporting materials 1, using 25 different commercially available copying machines, to prepare 25 image bearing image supporting materials.

The thus prepared image supporting materials were subjected to the same recycling treatment as in Example 1. The result was that the image was completely from each image supporting material.

COMPARATIVE EXAMPLE 5

25 image bearing image supporting materials were prepared in the same manner as in Example 2, and were subjected to recycling treatment, using the recycling apparatus shown in FIG. 4, which was used in Comparative Example 3, under the conditions that the recycling line speed was set at 8 mm/sec, the heating temperature was set at 130° C., and the image removal promoting liquid 11 was applied to each image bearing image supporting material in an amount of about 0.3 ml/A4 or more.

The result was that images were completely removed from 12 image bearing image supporting materials, but images were not completely removed from the rest of the image supporting materials.

This result indicates that the reason why the recycling was successfully performed with respect to all of the 25 image supporting materials in Example 2 is that the image supporting materials were heated under the condition that an excessive amount of the image removal promoting liquid 11 was being applied.

COMPARATIVE EXAMPLE 6

An image removal promoting liquid 11 was prepared with the following formulation:

| | wt. % |
|---|---|
| Sodium alkylsulfo-succinate (surfactant) | 0.03 |
| Diethylene glycol | 0.12 |
| Glycerin | 0.12 |
| Water | balance |

The thus prepared image removal promoting liquid 11 was placed in the liquid container 13 of the recycling apparatus shown in FIG. 1.

Image bearing transparent image supporting materials 1 were prepared in the same manner as in Example 1 and were successively subjected to the recycling treatment under the same conditions as in Example 1.

From the first three image bearing transparent image supporting materials 1, the image forming material was completely removed and the recycling thereof was successful. However, it was difficult to completely remove the image forming material from the fourth image bearing transparent image supporting material 1 on.

It was found that this difficulty was caused by nonuniform wetting of the surface of the liquid application roller 12 with the above-prepared image removal promoting liquid 11. This indicated that the above problem was when the concentration of the surfactant in the image removal promoting liquid 11 was insufficient. Therefore, the concentration of the surfactant in the image removal promoting liquid was increased up to about 0.05 wt. %, at which concentration, the recycling was successfully performed.

COMPARATIVE EXAMPLE 7

An image removal promoting liquid 11 was prepared with the following formulation:

| | wt. % |
|---|---|
| Sodium alkylsulfo-succinate (surfactant) | 3.0 |
| Diethylene glycol | 0.12 |
| Glycerin | 0.12 |
| Water | balance |

The thus prepared image removal promoting liquid 11 was placed in the liquid container 13 of the recycling apparatus shown in FIG. 1.

An image bearing transparent image supporting material 1 was prepared in the same manner as in Example 1 and subjected to the recycling treatment under the same conditions as in Example 1.

The result was that the image forming material was completely removed from the image supporting material 1, but white scalelike traces of a dried liquid remained on the recycled image supporting material 1. The scalelike traces were visible when this image supporting material was used as an OHP sheet and projected by an OHP projector. Therefore, the thus recycled image supporting material 1 was not suitable for use in practice.

Japanese Patent Application No. 08-284709 filed Oct. 7, 1996, and Japanese Patent Application filed Sep. 22, 1997, of which filing number is not available, are hereby incorporated by reference.

What is claimed is:

1. A method of recycling an image supporting material on which images can be formed from an image supporting material comprising (a) a non-absorbent substrate that cannot absorb liquids and (b) an absorbent swelling layer that swells with absorption of liquids, which is overlaid on said non-absorbent substrate and on which images are formed, by eliminating an image forming material which constitutes said images from said image supporting material, comprising the steps of:

applying to an image-bearing side of said image supporting material a liquid in an amount which exceeds a maximum amount of said liquid that can be absorbed by said absorbent swelling layer;

leveling said liquid applied to said image-bearing side of said image supporting material to form a liquid film layer on said image-bearing side of said image supporting material;

contacting said image supporting material with a heating member and a peeling member at a first contact point, to thereby heat said absorbent swelling layer or said liquid film layer;

bringing the peeling member into pressure contact with said image forming material downstream of said first contact point and when at least part of said liquid which constitutes said liquid film layer reaches an interface between said absorbent swelling layer and said image forming material deposited on said absorbent swelling layer, thereby causing said image forming material to adhere to said peeling member; and separating said peeling member to which said image forming material adheres from said image supporting material.

2. An apparatus for recycling an image supporting material on which images can be formed from an image supporting material comprising (a) a non-absorbent substrate that cannot absorb liquids and (b) an absorbent swelling layer that swells with absorption of liquids, which is overlaid on said non-absorbent substrate and on which images are formed, by eliminating an image-forming material which constitutes said images from said image bearing support material, comprising:

a liquid application section where a liquid is applied to an image-bearing side of said image supporting materials in such an amount that exceeds a maximum amount of said liquid that can be absorbed by said absorbent swelling layer;

a pair of holding and transport members, which hold therebetween said image supporting material to which said liquid has been applied, and transport said image supporting material along a holding and transport path, at least one of which holding and transport members comes into contact with said image-bearing side and comprises a peeling member which can be brought into contact with said image-forming material deposited on said absorbent swelling layer and comprises a material that can adhere to said image-forming material;

a heating member which heats (a) said absorbent swelling layer or said liquid film layer deposited on said image bearing support material which is held between said pair of holding and heating members, and (b) said image-forming material deposited on said image bearing support material, said heating member initially contacting said image-forming material and said peeling member at a first contact point;

a pressure application member positioned downstream of said first contact point which applies pressure to said holding and transport members in such a manner that said holding and transport member comprising said peeling member is caused to adhere to said image-forming material deposited on said image supporting material, at a position on said holding and transport path, where at least part of said liquid which constitutes said liquid film layer reaches an interface between said absorbent swelling layer and said image-forming material deposited on said absorbent swelling layer; and a separating section where said holding and transport member comprising said peeling member is separated from said image supporting material.

3. The apparatus as claimed in claim 2, wherein said holding and transport member comprising said peeling member is composed of a material through which a vapor of said liquid which constitutes said liquid film layer cannot permeate.

4. The apparatus as claimed in claim 2, wherein said liquid application section comprises:

a liquid container for containing said liquid, a rotatable roller-shaped liquid application member which is partly immersed into said liquid in said liquid container and capable of holding said liquid on a surface thereof and applying said liquid to said image supporting material, and a roller-shaped holding member for holding and urging said image supporting material toward said rotatable roller-shaped liquid application member.

5. An apparatus for recycling an image supporting material on which images can be formed from an image supporting material comprising (a) a non-absorbent substrate that cannot absorb liquids and (b) an absorbent swelling layer that swells with absorption of liquids, which is overlaid on said non-absorbent substrate and on which images are formed, by eliminating an image-forming material which constitutes said images from said image bearing support material, comprising:

a liquid application section where a liquid is applied to an image-bearing side of said image supporting material in such an amount that exceeds a maximum amount of said liquid that can be absorbed by said absorbent swelling layer;

a pair of holding and transport members, which hold therebetween said image supporting material to which said liquid has been applied, and transport said image supporting material along a holding and transport path, at least one of which holding and transport members comes into contact with said image-bearing side and comprises a peeling member which can be brought into contact with said image-forming material deposited on said absorbent swelling layer and comprises a material that can adhere to said image-forming material;

a heating member which heats (a) said absorbent swelling layer or said liquid film layer deposited on said image bearing support material which is held between said pair of holding and heating members, and (b) said image-forming material deposited on said image bearing support material;

a pressure application member which applies pressure to said holding and transport members in such a manner that said holding and transport member comprising said peeling member is caused to adhere to said image-forming material deposited on said image supporting material, at a position on said holding and transport path, where at least part of said liquid which constitutes said liquid film layer reaches an interface between said absorbent swelling layer and said image-forming material deposited on said absorbent swelling layer; and a separating section where said holding and transport member comprising said peeling member is separated from said image supporting material;

wherein said pair of holding and transport members comprises (a) a rotatable heating drum in which said heating member is built, and (b) a belt-shaped peeling member which is movably supported by at least two rollers, whereby said image supporting material is transported while held between part of an outer peripheral surface of said heating drum and said belt-shaped peeling member, one of said two rollers being situated at a holding transport initiation position for said image supporting material, and the other roller being situated at a holding transport termination position for said image supporting material, and said pressure application member comprises a pressure application roller which brings said belt-shaped peeling member into pressure contact with said heating drum on said holding and transport path which extends from said holding transport initiation position up to said holding transport termination position.

6. The apparatus as claimed in claim 5, wherein said holding and transport member comprising said peeling member is composed of a material through which a vapor of said liquid which constitutes said liquid film layer cannot permeate.

7. The apparatus as claimed in claim 5, wherein said liquid application section comprises:

a liquid container for containing said liquid, a rotatable roller-shaped liquid application member which is partly immersed into said liquid in said liquid container and capable of holding said liquid on a surface thereof and applying said liquid to said image supporting material, and a roller-shaped holding member for holding and urging said image supporting material toward said rotatable roller-shaped liquid application member.

8. An apparatus for recycling an image supporting material on which images can be formed from an image supporting material comprising (a) a non-absorbent substrate that cannot absorb liquids and (b) an absorbent swelling layer that swells with absorption of liquids, which is overlaid on said non-absorbent substrate and on which images are formed, by eliminating an image-forming material which constitutes said images from said image bearing support material, comprising:

liquid application means for applying a liquid to an image-bearing side of said image supporting materials in such an amount that exceeds a maximum amount of said liquid that can be absorbed by said absorbent swelling layer;

holding and transport means for holding therebetween said image supporting material to which said liquid has been applied, and for transporting said image supporting material along a holding and transport path, at least one of which holding and transport means comes into contact with said image-bearing side and comprises a peeling means which can be brought into contact with said image-forming material deposited on said absorbent swelling layer and comprises a material that can adhere to said image-forming material;

heating means for heating (a) said absorbent swelling layer or said liquid film layer deposited on said image bearing support material which is held between said holding and heating means, and (b) said image-forming material deposited on said image bearing support material, said heating means initially contacting said image-forming material and said peeling means at a first contact point;

pressure application means positoned downstream of said first contact point for applying pressure to said holding and transport means in such a manner that said holding and transport means comprising said peeling means is caused to adhere to said image-forming material deposited on said image supporting material, at a position on said holding and transport path, where at least part of said liquid which constitutes said liquid film layer reaches an interface between said absorbent swelling layer and said image-forming material deposited on said absorbent swelling layer; and separating means for separating said holding and transport means comprising said peeling means from said image supporting material.

9. The apparatus as claimed in claim 8, wherein said holding and transport means comprising said peeling member is composed of a material through which a vapor of said liquid which constitutes said liquid film layer cannot permeate.

10. An apparatus for recycling an image supporting material on which images can be formed from an image supporting material comprising (a) a non-absorbent substrate that cannot absorb liquids and (b) an absorbent swelling layer that swells with absorption of liquids, which is overlaid on said non-absorbent substrate and on which images are formed, by eliminating an image-forming material which constitutes said images from said image bearing support material, comprising:

liquid application means for applying a liquid to an image-bearing side of said image supporting material in such an amount that exceeds a maximum amount of said liquid that can be absorbed by said absorbent swelling layer;

holding and transport means for holding therebetween said image supporting material to which said liquid has been applied, and for transporting said image supporting material along a holding and transport path, at least one of which holding and transport members comes into contact with said image-bearing side and comprises a peeling means which can be brought into contact with said image-forming material deposited on said absorbent swelling layer and comprises a material that can adhere to said image-forming material;

heating means for heating (a) said absorbent swelling layer or said liquid film layer deposited on said image bearing support material which is held between said holding and heating means, and (b) said image-forming material deposited on said image bearing support material;

pressure application means for applying pressure to said holding and transport means in such a manner that said holding and transport means comprising said peeling means is caused to adhere to said image-forming material deposited on said image supporting material, at a position on said holding and transport path, where at least part of said liquid which constitutes said liquid film layer reaches an interface between said absorbent swelling layer and said image-forming material deposited on said absorbent swelling layer; and separating means for separating said holding and transport means comprising said peeling means from said image supporting material;

wherein said holding and transport means comprises (a) rotatable heating means in which said heating member is built, and (b) a belt-shaped peeling means which is movably supported by at least two rollers, whereby said image supporting material is transported while held between part of an outer peripheral surface of said rotatable heating means and said belt-shaped peeling means, one of said two rollers being situated at a holding transport initiation position for said image supporting material, and the other roller being situated at a holding transport termination position for said image supporting material, and said pressure application means comprises a pressure application roller which brings said belt-shaped peeling means into pressure contact with said rotatable heating means on said holding and transport path which extends from said holding transport initiation position up to said holding transport termination position.

11. The apparatus as claimed in claim 10, wherein said holding and transport means comprising said peeling means is composed of a material through which a vapor of said liquid which constitutes said liquid film layer cannot permeate.

12. The apparatus as claimed in claim 10, wherein said liquid application means comprises:

liquid container means for containing said liquid, rotatable roller-shaped liquid application means which is partly immersed into said liquid in said liquid container and for holding said liquid on a surface thereof and applying said liquid to said image supporting material, and roller-shaped holding means for holding and urging said image supporting material toward said rotatable roller-shaped liquid application means.

* * * * *

UNITED STATES PATENT AND TRADEMARK OFFICE

CERTIFICATE OF CORRECTION

PATENT NO. : 5,968,301

DATED : October 19, 1999

INVENTOR(S): KAKUJI MURAKAMI ET AL.

It is certified that an error appears in the above-identified patent and that said Letters Patent is hereby corrected as shown below:

Col. 12, line 48, change "for as" to --used for--

Col. 14, line 38, change "recycled" to --recycling--

Col. 29, line 66, after "completely" insert --removed--.

Signed and Sealed this

Twenty-seventh Day of March, 2001

*Attest:*

NICHOLAS P. GODICI

*Attesting Officer*

*Acting Director of the United States Patent and Trademark Office*